(12) United States Patent
Hoshizuki

(10) Patent No.: US 12,361,417 B2
(45) Date of Patent: Jul. 15, 2025

(54) INFORMATION PROCESSING APPARATUS, AND INFORMATION PROCESSING SYSTEM

(71) Applicant: AXELL CORPORATION, Tokyo (JP)

(72) Inventor: Yusuke Hoshizuki, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 141 days.

(21) Appl. No.: 18/457,864

(22) Filed: Aug. 29, 2023

(65) Prior Publication Data

US 2024/0020696 A1    Jan. 18, 2024

Related U.S. Application Data

(63) Continuation of application No. PCT/JP2021/042290, filed on Nov. 17, 2021.

(30) Foreign Application Priority Data

Mar. 5, 2021   (JP) ................................ 2021-035335

(51) Int. Cl.
*G06Q 20/40* (2012.01)
*G06Q 20/38* (2012.01)
(Continued)

(52) U.S. Cl.
CPC ....... *G06Q 20/401* (2013.01); *G06Q 20/3825* (2013.01); *G06Q 20/3829* (2013.01); *H04L 9/0825* (2013.01); *H04L 9/3247* (2013.01)

(58) Field of Classification Search
CPC ............. G06Q 20/401; G06Q 20/3825; G06Q 20/3829; H04L 9/0825; H04L 9/3247
See application file for complete search history.

(56) References Cited

U.S. PATENT DOCUMENTS 10,992,469 B2 *   4/2021   Cheng .................... H04L 9/0897
11,677,240 B2 *   6/2023   Lu .......................... G06Q 50/40
                                                                    700/291
(Continued)

FOREIGN PATENT DOCUMENTS

JP    2020-129282 A    8/2020
WO   WO 2019/219631 A1  11/2019

OTHER PUBLICATIONS

WIPO, Japanese International Search Authority, International Search Report with English Translation and Written Opinion mailed Feb. 1, 2022 in International Patent Application No. PCT/JP2021/042290, 8 pages.

*Primary Examiner* — Bennett M Sigmond
*Assistant Examiner* — Marla Hudson
(74) *Attorney, Agent, or Firm* — MASUVALLEY & PARTNERS; Peter Martinez

(57) ABSTRACT

An information processing apparatus that processes a priority granting process, the information processing apparatus includes a memory unit that memorizes a verification key for verifying an electronic signature for priority approval generated by using a private key of a priority seller that grants a prioritized approval authority to a transaction. The information processing apparatus further includes a processor which executes a process including verifying using the verification key, an electronic signature given to an unapproved transaction publicized on a distributed ledger, generating when an electronic signature given to the unapproved transaction is verified by the verifying as the electronic signature for priority approval, a block that preferentially includes the unapproved transaction over unapproved transactions to which the electronic signature for priority approval is not given, and publicizing the block on the distributed ledger.

13 Claims, 13 Drawing Sheets

(51) Int. Cl.
    *H04L 9/08*         (2006.01)
    *H04L 9/32*         (2006.01)

(56)           References Cited

U.S. PATENT DOCUMENTS

2019/0354397 A1    11/2019   Goel et al.
2022/0383304 A1*  12/2022   Camenisch .......... G06Q 20/223

\* cited by examiner

FIG.3

STEP (11)
PRIORITY SELLING DEVICE 20 ←—— PAY CASH AND THE LIKE —— USER

STEP (12)
PRIORITY SELLING DEVICE 20 ←—— TRANSMIT TRANSACTION TxA —— USER

ScriptPubKey(output)
· PUBLIC KEY OF REMITTANCE DESTINATION
· SENDING AMOUNT
ScriptSig(input)
· ELECTRONIC SIGNATURE OF USER
· PUBLIC KEY OF USER
TRANSACTION ID

STEP (13)
PRIORITY SELLING DEVICE 20    CREATE ELECTRONIC SIGNATURE Sig_A

STEP (14)    ↑ TO NETWORK 30
PRIORITY SELLING DEVICE 20
CREATE AND PUBLICIZE TRANSACTION TxP

ScriptPubKey(output)
· PUBLIC KEY OF REMITTANCE DESTINATION
· SENDING AMOUNT
ScriptSig(input)
· ELECTRONIC SIGNATURE OF USER
· PUBLIC KEY OF USER
TRANSACTION ID
· ELECTRONIC SIGNATURE OF PRIORITY SELLER
· PUBLIC KEY OF PRIORITY SELLER

STEP (15)
VERIFY TRANSACTION TxP
ACQUIRE AND VERIFY ELECTRONIC SIGNATURE Sig_A    NODE DEVICE 300

STEP (16)    GENEATE BLOCK    NODE DEVICE 300

STEP (17)    PERFORM MINING    NODE DEVICE 300

STEP (18)    PUBLICIZE BLOCK    NODE DEVICE 300

FIG.7
STEP(51)
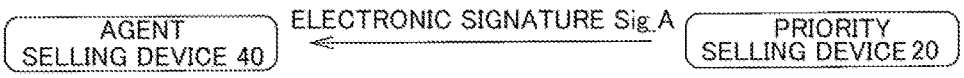
STEP(52)
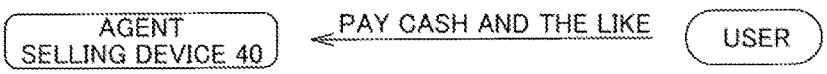
STEP(53)
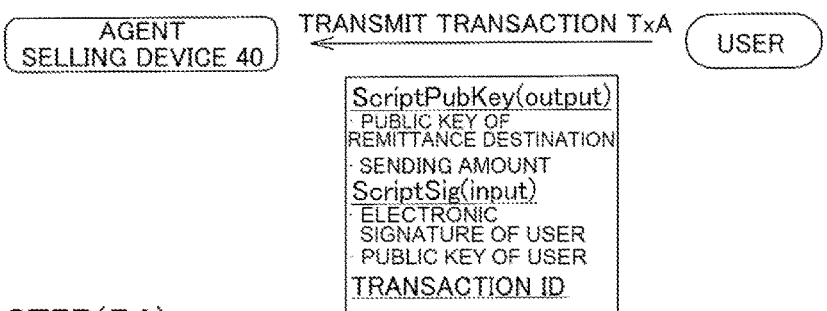
STEP(54)
STEP(55)
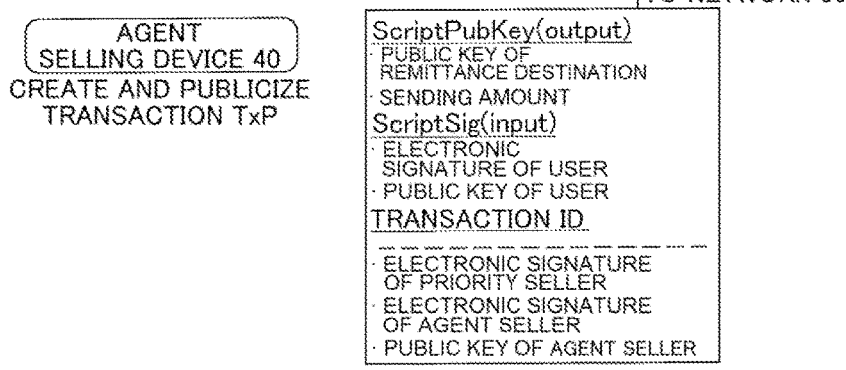
STEP(56)

FIG.9

STEP(71)
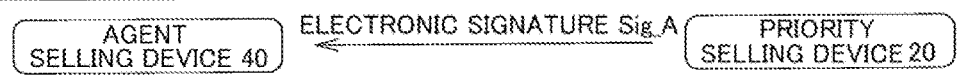
AGENT SELLING DEVICE 40 ← ELECTRONIC SIGNATURE Sig_A ← PRIORITY SELLING DEVICE 20

STEP(72)
AGENT SELLING DEVICE 40 ← PAY CASH AND THE LIKE ← USER

STEP(73)
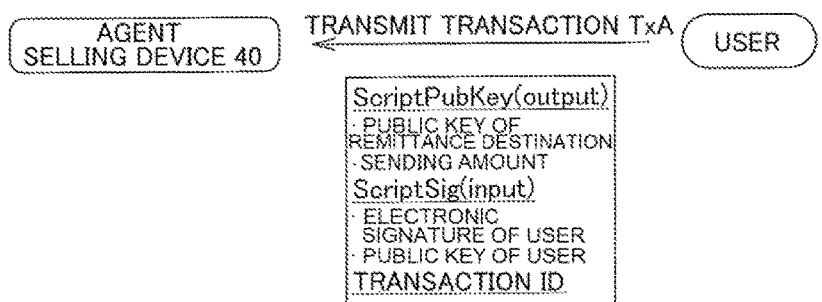
AGENT SELLING DEVICE 40 ← TRANSMIT TRANSACTION TxA ← USER

ScriptPubKey(output)
· PUBLIC KEY OF REMITTANCE DESTINATION
· SENDING AMOUNT
ScriptSig(input)
· ELECTRONIC SIGNATURE OF USER
· PUBLIC KEY OF USER
TRANSACTION ID STEP(74)
AGENT SELLING DEVICE 40    GENERATE ELECTRONIC SIGNATURE Sig_B STEP(75)      TRANSMIT PUBLIC KEY OF AGENT SELLER TO WHICH ELECTRONIC SIGNATURE Sig_A IS ATTACHED
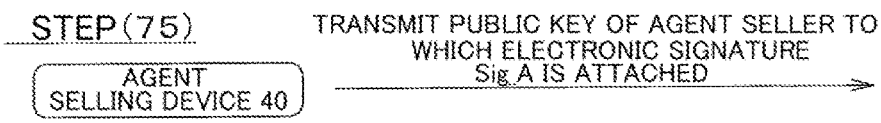
AGENT SELLING DEVICE 40 → NODE DEVICE 300

STEP(76)
VERIFY PUBLIC KEY OF AGENT SELLER    NODE DEVICE 300

STEP(77)                                    TO NETWORK 30
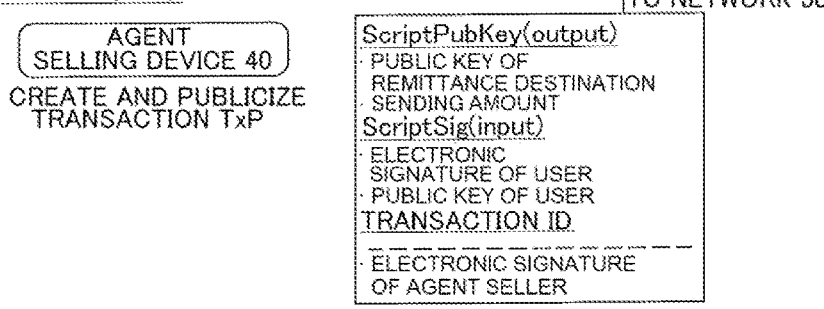
AGENT SELLING DEVICE 40
CREATE AND PUBLICIZE TRANSACTION TxP ScriptPubKey(output)
· PUBLIC KEY OF REMITTANCE DESTINATION
· SENDING AMOUNT
ScriptSig(input)
· ELECTRONIC SIGNATURE OF USER
· PUBLIC KEY OF USER
TRANSACTION ID
-----
· ELECTRONIC SIGNATURE OF AGENT SELLER STEP(78)
VERIFY TRANSACTION TxP
ACQUIRE AND VERIFY ELECTRONIC SIGNATURE Sig_B    NODE DEVICE 300

INFORMATION PROCESSING APPARATUS, AND INFORMATION PROCESSING SYSTEM

This application is a continuation of and claims priority to International Application No. PCT/JP2021/042290 filed on Nov. 17, 2021, entitled Node Device, Information Processing System, Preference Granting Method, and Preference Granting Program, which claims priority to Japanese Application No. 2021-035335 filed Mar. 5, 2021, both of which are incorporated herein by reference in their entireties.

FIELD OF THE INVENTION

The embodiments discussed herein are related to an information processing apparatus, an information processing system, an information processing method, and a non-transitory computer-readable recording medium.

BACKGROUND OF THE INVENTION

Crypto-assets using a blockchain such as Bitcoin, Litecoin, and Monacoin are known.

There are also blockchain systems such as Ethereum having a mechanism known as "smart contract", which is based on the credibility blockchains have.

Smart contract can create values such as new crypto-assets by recording an arbitrary token balance and the like in a blockchain and can write important information in a blockchain.

In processing accompanying writing in a blockchain such as a payment using sending of crypto-assets and transfer of tokens, a client device transmits a trade history referred to as "transaction" to a network. Subsequently, a miner node connected to the network needs to perform a process of approving a transaction transmitted from the client device to take it in the blockchain.

As described in, for example, Japanese Patent Application Laid-open No. 2020-129282, a transaction fee is written in a transaction that is transmitted to a network. The transaction fee is a reward to a miner that has taken in the transaction, so that the transaction fee is a motivation for approving to take in transactions.

In Ethereum described above, transaction fees are the motivation for miners to approve transactions to take them in a blockchain. Therefore, transactions with a higher fee are more likely to be approved preferentially. Accordingly, as a higher fee is paid, the corresponding transaction tends to be approved earlier and the fee is more likely to rise in a time range where a network is congested.

In Ethereum, there is a mechanism that the fee for a transaction that has already been transmitted to a network once can be added on. However, a required amount of money varies depending on the congestion state of the network and the time that can be spared to wait for an approval, so that it is necessary to obtain extra ETH.

This is not a significant problem for a user who constantly keeps a certain amount of ETH. However, as for a user who normally uses legal tender such as cash and makes a payment with Ethereum and performs token operations on rare occasions, constantly owning ETH that has large price fluctuations poses a risk. Further, if a user attempts to purchase ETH each time it becomes necessary, it is difficult to estimate what amount of ETH should be purchased.

SUMMARY OF THE INVENTION

According to an aspect of the embodiments, an information processing apparatus that processes a priority granting process, the information processing apparatus includes a memory unit that memorizes a verification key for verifying an electronic signature for priority approval generated by using a private key of a priority seller that grants a prioritized approval authority to a transaction.

The information processing apparatus further includes a processor which executes a process including verifying using the verification key, an electronic signature given to an unapproved transaction publicized on a distributed ledger, generating when an electronic signature given to the unapproved transaction is verified by the verifying as the electronic signature for priority approval, a block that preferentially includes the unapproved transaction over unapproved transactions to which the electronic signature for priority approval is not given, and publicizing the block on the distributed ledger.

The objects and advantages of the invention will be realized and achieved by the elements and combinations specifically pointed out in the claims.

It is to be understood that both the foregoing general description and the following detailed description are exemplary and illustrative and are not intended to limit the invention as claimed.

BRIEF DESCRIPTION OF THE DRAWINGS

FIG. 3 is an explanatory diagram of a flow of a priority granting process in a first example.

FIG. 7 is an explanatory diagram of a flow of a priority granting process in a third example.

FIG. 9 is an explanatory diagram of a flow of another processing in the priority granting process in the third example.

DESCRIPTION

Figure 1:
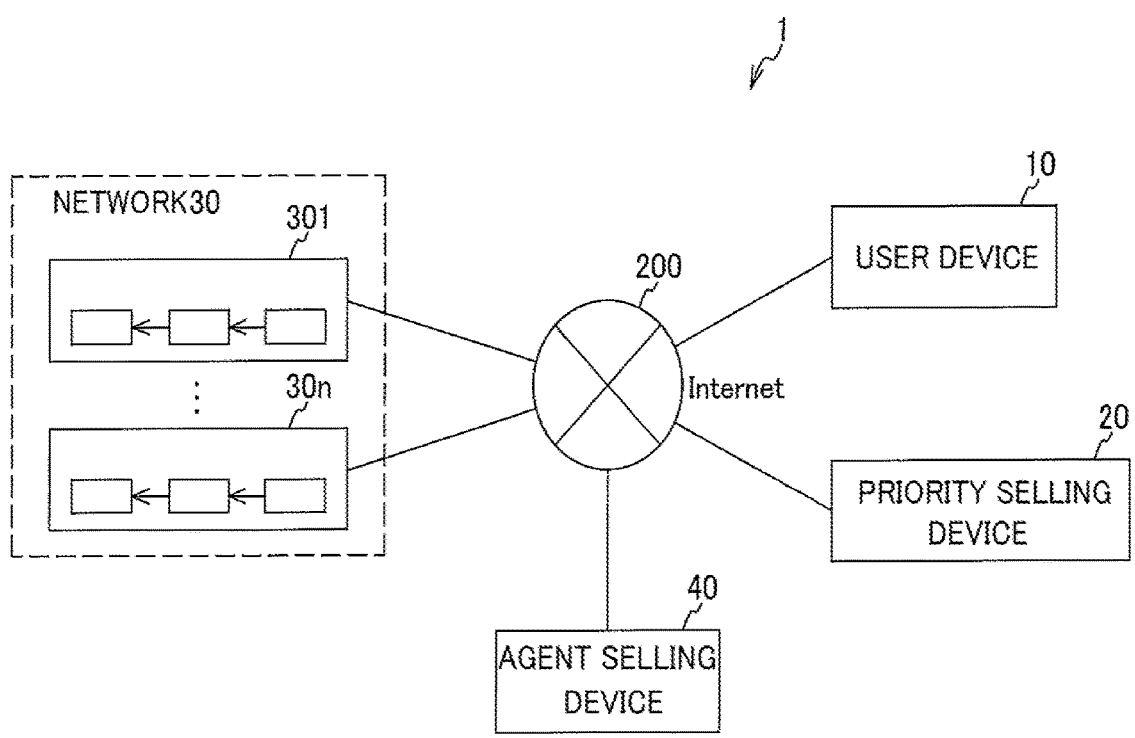
FIG. 1 is a diagram illustrating an example of a network configuration according to the present embodiment.

An embodiment of the present invention is described below in detail with reference to the drawings.

An information processing system according to the present embodiment grants, when approving a transaction necessary for, for example, sending crypto-assets on a distributed ledger, an authority to preferentially approve a certain transaction to a user even without purchasing crypto-assets in order to pay a transaction fee.

A distributed ledger is based on a distributed ledger technology and has a configuration in which data having a structure capable of detecting tampering using an electronic signature and a hash pointer is held in a plurality of nodes distributed on a network. As a distributed ledger, for example, blockchain and DAG (Directed acyclic graph) are known. In the present specification, a blockchain is described as an example of the distributed ledger technology.

In the DAG, when a user has created a transaction, a previously publicized unapproved transaction is approved. The transaction created by the user is also approved by an unapproved transaction publicized later. There is employed a consensus algorithm such that, upon being approved directly or indirectly by unapproved transactions the number of which is equal to or larger than a threshold, the transaction created by the user is deemed to be agreed on a network.

As described above, although there is a difference in its consensus algorithm from that of blockchain described later, the DAG can employ a transaction structure that is equivalent to that of blockchain.

Therefore, processing using blockchain as a distributed ledger and processing using DAG as a distributed ledger can be performed by using transactions having the same structure. Therefore, processing using blockchain as a distributed ledger described below can be performed by using DAG as a distributed ledger.

First, as an element technology to realize the information processing system according to the present embodiment, a blockchain and sending of crypto-assets are summarized as an example of a distributed ledger.

[Blockchain]

A blockchain is a database that generates blocks each including a plural pieces of trade information and couples the generated blocks so as to record data in a distributed network.

In addition to plural pieces of trade information, each of the blocks includes a hash value indicating contents of a block generated immediately before, so that the blockchain has a data structure in which generated blocks are connected to one another along with a time series. It is a basic technology of crypto-assets (virtual currency) represented by Bitcoin, Monacoin, Ethereum, and the like.

Asset trading is expressed in a data format as "transaction" and it is shared on a P2P network. An operation of collecting transactions in its entirety in a Merkle tree and searching for Nonce in which a hash value generated by collecting a root node (Merkle root) of the Merkle tree, a hash value of a previous block, an arbitrary value referred to as "Nonce", and the like is equal to or smaller than a certain value is referred to as "mining".

When mining is successful, a mining reward is given. A mechanism in which, because the amount of calculation resources provided for mining increases for the purpose of gaining the mining reward, the older the data is, the more difficult the tampering becomes, is referred to as "PoW (Proof of Work) blockchain system".

A mechanism in which a certain reward is given in this manner so that resources to guarantee the credibility of database are provided is referred to as "blockchain".

Other than PoW blockchain, Pos blockchain, PoI blockchain, and PoC blockchain are also applicable; however, explanations thereof are omitted.

[Mechanism of Sending of Crypto-Assets]

Crypto-assets that are currently in the mainstream are roughly divided into two types. These are Litecoin, Monacoin, and the like having been derivatively developed from Bitcoin and Rootstock and the like having been derivatively developed from Ethereum.

In the former example, the substance of crypto-assets is unspent transaction output (UTXO). Normally, UTXO is locked so it can be only unlocked with an electronic signature using an elliptic curve cryptosystem referred to as ECDSA. Further, normally, a public key corresponding to a private key is written in UTXO so as to enable only an "owner" having a specific private key to unlock it.

A node device unlocks UTXO by giving an ECDSA electronic signature corresponding to a public key written in the UTXO. The node device then connects the unlocked UTXO to input of a new transaction and writes a public key of a sending destination owner in UTXO of the new transaction. With this process, sending of crypto-assets using a blockchain is realized.

In practice, UTXO has an area referred to as ScriptPubKey, and a program written in a programming language referred to as Script is written in the area. The input of a transaction attempting to connect to the UTXO has an area referred to as ScriptSig, and when the two areas match each other, the UTXO is unlocked.

Ethereum and crypto-assets derived therefrom can realize a mechanism equivalent to that described here by using a smart contract.

FIG. 1 is a diagram illustrating an example of a network configuration according to the present embodiment.

A network includes a user device 10 (client device), a seller device 20 (server device), an agent selling device 40, a network 30, and a network 200. The user device 10, the seller device 20, and the network 30 are communicably connected to one another via the network 200. The user device 10, the seller device 20, and the agent selling device 40 are, for example, computer devices described later.

The network 30 is a distributed network such as a P2P network and records trade information on a blockchain.

In the following descriptions, as an example, the network 30 is described on the assumption that Proof of Work (PoW) as a consensus algorithm of Bitcoin is employed.

A blockchain that records therein trades occurred in the network 30 is also referred to as "blockchain of Bitcoin". The network 30 may also employ other types of consensus algorithms such as Proof of Stake (PoS), Proof of Importance (PoI), and Proof of Consensus (PoC).

In the network 30, a plurality of node devices 301 to 30$n$ that perform mining are communicably connected to one another. In the following descriptions, when the node devices 301 to 30$n$ are not specifically distinguished from one another, these are referred to as "the node device 300".

In Proof of Work, mining is an operation of, as a hash function is applied to data of blocks while Nonce included in the blocks is changed, searching for Nonce with a hash value in which a predetermined number or more of 0 s are arranged on a higher level (hereinafter, also "correct Nonce"). Data of blocks includes a hash value of data of a previous block to which the block is coupled, Nonce, and trade information.

A node device verifies transactions included in a block when generating the block. Subsequently, the node device approves a correct transaction, includes the approved transaction in the block to perform an operation of searching for Nonce. Upon finding correct Nonce, the node device generates a block including the correct Nonce and couples a newly generated block to a blockchain held in the node device. Further, the node device transmits the newly generated block to a network of the blockchain. Thereafter, the newly generated block is also coupled to a blockchain held in another node device that is connected to the network. With this process, the transaction is recorded in the blockchain. In the following descriptions, a fact that a block including a transaction is coupled to a blockchain is also referred to as "a transaction is recorded in a blockchain".

Connection of the network 200 is not limited to the network 30 and the network 200 may be also connected to other networks. Further, in addition to the user device 10 and the priority selling device 20, the network 200 may be also connected to other trading devices.

Figure 2A:
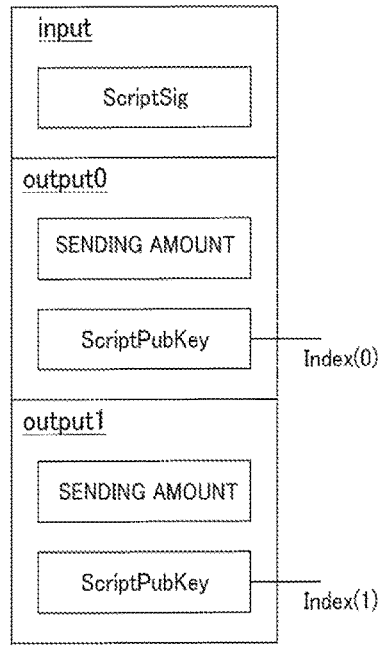
FIGS. 2A and 2B are diagrams illustrating an example of trade information on crypto-assets.
Figure 2B:
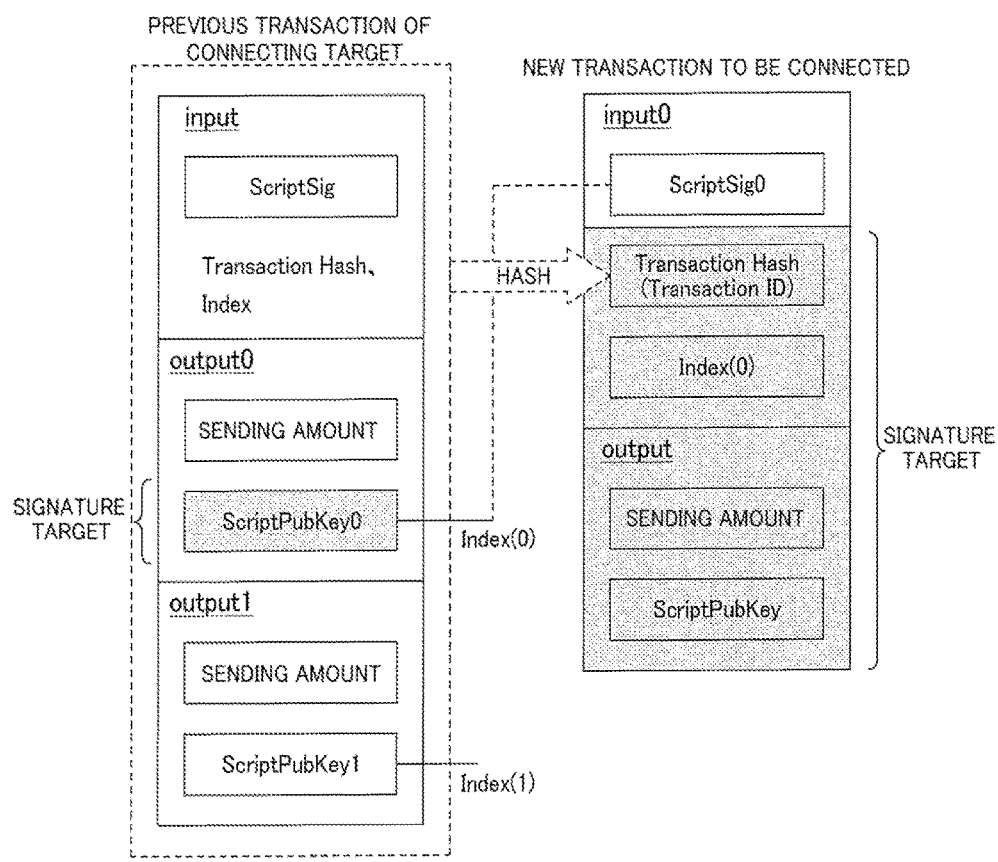

FIGS. 2A and 2B are diagrams illustrating an example of trade information on crypto-assets.

FIG. 2A is an explanatory diagram of a structure of trade information. FIG. 2B is an explanatory diagram of a process of connecting trade information. The trade information is a transaction used for a process in which delivery and reception of crypto-assets are performed to transfer the ownership of the crypto-assets.

In the following descriptions, it is assumed that a P2PKH (Pay to Public Key Hash) is used as a transaction script. When a P2PK (Pay to Public Key) is used as a transaction script, ScriptPubKey that locks UTXO includes a public key of a user on a transmission destination who is a recipient of UTXO. Further, in the P2PK, ScriptSig that unlocks UTXO includes an electronic signature generated by using a private key of a user on a transmission source who is a granter of UTXO and creates a transaction.

UTXO is output of an unspent transaction that is not used as input of a transaction. UTXO is an ownership of crypto-assets and is used as input of the next transaction. Therefore, sending of crypto-assets is a process in which UTXO is used by a sender and UTXO only usable by a receiver is created. The input of a transaction is information for processing usage of crypto-assets. The output of a transaction is information for processing use of crypto-assets.

To own assets in Bitcoin and various types of altcoins derived therefrom means that, among output of transactions recorded in a blockchain database, there is output (UTXO) that is unused and can be unlocked by a user himself. The unlocking conditions of UTXO are written in an area referred to as ScriptPubKey, and normally UTXO can be unlocked with an electronic signature of an owner and connected to input of another transaction.

An electronic signature is a value obtained by encrypting, with a private key of a user on a transmission source who creates a transaction, a value for an electronic signature obtained by using data except for ScriptSig of a transaction and ScriptPubKey of a previous transaction. The previous transaction is a transaction that is connected to input of a transaction created by the user on the transmission source at the time of remittance and includes output in which information on remittance to the user on the transmission source is described. The value for an electronic signature is, for example, a value obtained by applying a hash function to data except for ScriptSig of a transaction and data including ScriptPubKey of a previous transaction.

A configuration of a transaction is described with reference to FIG. 2A.

A transaction is trade information in which transfer of the ownership of crypto-assets is summarized. The transaction includes input and output.

The input is information for unlocking UTXO of a previous transaction owned by a user on a transmission source who creates a transaction. The input includes ScriptSig.

ScriptSig is a program for unlocking UTXO owned by the user on the transmission source. The ScriptSig includes an electronic signature and a public key of the user on the transmission source. The electronic signature and the public key included in ScriptSig are values generated by using a private key of the user on the transmission source.

The output is information indicating transfer of the ownership of crypto-assets. The output includes a sending amount and ScriptPubKey.

ScriptPubKey is a program in which conditions to unlock output of a transaction are defined. ScriptPubKey includes a hash value of a public key generated by using a private key of a user on a transmission source (hereinafter, also "public key hash").

A process of connecting transactions is described with reference to FIG. 2B. In the following descriptions, as an example, a process in which output0 of a previous transaction as a connection target is connected to a new transaction is described. Each transaction is assumed to be processed in the network 30.

The output of a previous transaction includes output0 having a remittance amount and ScriptPubKey0 and output1 having a remittance amount and ScriptPubKey 1. Output0 and output1 are associated with Index0 and Index1, respectively. Index0 and Index1 are identifiers to respectively identify output0 and output1.

Input0 of a new transaction is connected to Output0 of the previous transaction. Output0 of the previous transaction is in a state of UTXO until input of the new transaction is connected thereto.

Input0 of a new transaction includes ScriptSig, a transaction hash of a previous transaction, and Index0 as an identifier of output of the previous transaction.

ScriptSig0 includes an electronic signature and a public key used for a process of unlocking output0 of the previous transaction. For example, the electronic signature is generated by encrypting, by using a private key, a value for an electronic signature obtained by using data except for ScriptSig0 of the new transaction and ScriptPubKey0 included in output0 of the previous transaction. At this time, as the private key, a private key of a user who creates a new transaction is used.

A transaction hash is a hash value of the entirety of the previous transaction. The transaction hash is used as a transaction ID for identifying the previous transaction. Index0 is an identifier to identify output0 of a connection target in the previous transaction.

The process of connecting output0 included in the previous transaction and input0 included in the new transaction described above is described. In the following descriptions, it is assumed a case where the previous transaction is in a state of being recorded in a blockchain of Bitcoin.

A trading device creates a new transaction and transmits the new transaction to the network to thereby memorize the new transaction in a memory pool (mempool) that is provided in each node device 300 and memorizes unapproved transactions. When the new transaction is memorized in the memory pool, the node device 300 references a transaction ID and Index0 written in input of the new transaction and searches for transactions on a blockchain. The node device 300 finds a previous transaction corresponding to the transaction ID and then finds output0 corresponding to Index0.

Thereafter, the node device 300 couples ScriptSig0 included in input0 and ScriptPubKey0 included in output0 to each other. With this process, the node device 300 performs a first verification to verify matching between a hash value of a public key included in ScriptSig0 and a public key hash included in ScriptPubKey0. Further, the node device 300 performs a second verification to verify an electronic signature by using an electronic signature and a public key included in ScriptSig0. Only when the first verification and the second verification have passed, the node device 300 connects output0 of a previous transaction and input0 of a new transaction to each other.

Subsequently, the node device 300 includes a new transaction confirmed as a result of verification that it is created by a legitimate owner in a block and performs an operation of searching for Nonce. Upon finding correct Nonce, the node device 300 creates a block including the correct Nonce and couples the newly created block to a blockchain held in the node device 300. Further, the node device 300 transmits the newly created block to a network of the blockchain. With this process, the newly created block is also coupled to a blockchain held in another node device that is connected to the network and the new transaction is recorded in the blockchain.

As also described later, the node device 300 builds a Merkle tree including a transaction referred to as "Coinbase transaction" for receiving a mining reward (a transaction with void input and used for sending a predetermined reward to a miner), and searches for Nonce of a block including a Merkle root of the Merkle tree.

The information processing system according to the present embodiment is described below in detail.

In the information processing system illustrated in FIG. 1, the user device 10 is a terminal device used by a user of the information processing system. The user makes, for example, a payment with sending of crypto-assets on a smart contract. The user device 10 creates, for example, a transaction for the user to send crypto-assets.

The priority selling device 20 is a device that is used by a priority seller that sells a prioritized approval authority of a transaction. The priority seller may be, for example, a developer of a node program (mining program) executed by the node device 300. In the following descriptions, a prioritized approval authority may be described as "priority".

As a priority seller receives a price with a corresponding worth of a fee for a transaction from a user who wishes to issue a transaction, the priority seller preferentially approves the transaction.

The payment of the price to the priority seller can be made with legal tender such as cash or crypto-assets.

When a user pays the price, the priority selling device 20 generates an electronic signature with regard to a transaction created by the user device 10 by using a private key of the priority seller.

The priority selling device 20 creates a transaction with priority in which an electronic signature generated by using the private key of the priority seller is given to the transaction created by the user device 10, and then publicizes the created transaction on a network on behalf of the user.

It is also possible to configure that the electronic signature of the priority seller is given to the user and the user publicizes the transaction with priority to which the electronic signature of the priority seller is given on a network.

The electronic signature of the priority seller may be publicized as a part of data blocks of a transaction or may be publicized on a network separately from the transaction.

The agent selling device 40 is a device that is used by an agent seller that acts by proxy for a priority seller and sells a prioritized approval authority of a transaction. The agent selling device 40 is described later in detail.

In the present specification, specifically, an electronic signature given to a transaction is a digital signature. An electronic signature is a term representing a broader concept including a digital signature. A digital signature represents a signature itself that is given on a signature algorithm such as an ECDSA signature or electronic data, whereas an electronic signature means a function of proving something by using a digital signature and the like. The function of an electronic signature is roughly divided into two parts, which are proving that a person having signed an electronic signature with regard to certain electronic data is the creator of the electronic data and proving that the electronic data is not tampered after signing the electronic signature.

A combination of a verification key with regard to a digital signature (a public key paired with a private key having been used when the digital signature is generated) and the digital signature is called "digital certificate". A digital signature, such a digital certificate, and the like are examples of an electronic signature.

The node device 300 selects, when mining on a new block is started, a transaction to be included in a block from unapproved transactions that are publicized on a network and memorized in a memory pool.

Subsequently, the node device 300 constitutes a Merkle tree of selected transactions and starts mining on a block.

At this time, when there is a transaction with priority in the memory pool (when a transaction with priority is publicized on the network 30), the node device 300 preferentially includes this transaction in the block and performs mining to approve the transaction, and then incorporates the transaction in a blockchain.

Here, "preferentially" means, among unapproved transactions memorized in a memory pool, a certain transaction is preferred over transactions not having an electronic signature of a priority seller given thereto or transactions not being associated with an electronic signature of a priority seller.

The node device 300 confirms whether an electronic signature included in an unapproved transaction memorized in a memory pool belongs to the priority selling device 20. When the electronic signature belongs to a priority seller, the node device 300 confirms that the unapproved transaction is a transaction with priority that has been issued as a result of a user paying a price to the priority seller.

An electronic signature of a priority seller proves to the node device 300 that, based on a fact that a user has made a payment to the priority seller, a certain transaction has a right to be processed preferentially.

It is also possible to configure such that a transaction of a user who has paid more cash and the like to the priority selling device 20 is approved more preferentially. In this case, for example, the priority selling device 20 issues an electronic signature with a ranked priority according to the amount of money paid by a user. The priority selling device 20 may give an electronic signature with a value indicating its priority.

When there are a plurality of transactions with priority in a memory pool, the node device 300 performs a process of preferentially taking a transaction with a higher priority among these transactions in a block and approving the transaction.

In the information processing system according to the present embodiment, the node device 300 holds a public key of a priority seller as a verification key for verifying an electronic signature of the priority seller. That is, in order to enable the node device 300 to verify the electronic signature of the priority seller, a node program includes a public key corresponding to a private key of a node developer as the priority seller. The public key of the priority seller may be supplied to the node device 300 separately from the node program. For example, it is possible to configure such that the public key of the priority seller is given to a transaction and publicized with the transaction.

The node device 300 includes a memory pool that is a memory area in which unapproved transactions not added to a block are temporarily memorized.

The node device 300 verifies, among the unapproved transactions memorized in the memory pool, a transaction with priority including an electronic signature verified with a public key of the priority seller to preferentially include the transaction in a block.

The node device 300 may hold public keys of a plurality of different priority sellers and may handle a case where there are a plurality of priority selling devices 20.

With the mechanism described above, a user can purchase a right to have a certain transaction approved preferentially with legal tender or crypto-assets.

If it is sending of Ethereum, a user only needs to purchase ETH for a sum of sending amount without taking ETH for a transaction fee into consideration. If it is an operation of a smart contract such as token transfer, it is not necessary to purchase ETH for a fee. Therefore, it becomes unnecessary to perform a difficult operation of estimating an amount of ETH required for a transaction fee that largely fluctuates according to the reasons described above.

Further, as the priority selling device 20 intervenes, the exchange rate between cash and the like corresponding to a transaction fee and Ethereum used as a transaction fee can be made constant, thereby improving usability of Ethereum as remittance means.

It is also possible to save the fee paid to an exchange for purchasing Ethereum used as a transaction fee.

The node device 300 belonging to a miner who has succeeded in mining can receive a certain amount of crypto-assets as a mining reward by publicizing a Coinbase transaction in order to receive a mining reward. When a Coinbase transaction is approved in a network, the miner of the node device 300 can receive the mining reward.

When priority can be simply granted, there may occur a problem that the miner's motivation for approving a transaction is lost.

To handle this problem, it is possible to configure such that, for example, by approving a transaction with priority, a reward larger than a reward agreed in the entire network can be received.

For example, when generating a new block, a miner calculates an amount of additional crypto-assets corresponding to a value obtained by multiplying the number of transactions with priority included in a block by a coefficient agreed in the entire network in advance. The miner then creates a Coinbase transaction for receiving a mining reward obtained by adding the calculated crypto-assets to a normal mining reward. Subsequently, the miner may perform a process of including the created Coinbase transaction in a newly created block.

For example, in Ethereum, when a miner has approved two transactions with priority, 0.2 ETH corresponding to 0.2, which is obtained by multiplying the number of approved transactions with priority 2 by a coefficient 0.1, is set to be an additional mining reward. That is, when a normal mining reward is 3.0 ETH, the miner may write, as a mining reward, 3.2 ETH, which is obtained by adding an additional mining reward 0.2 ETH to the normal mining reward 3.0, in output of a Coinbase transaction.

The value of coefficient for increasing the mining reward may be set to be increased and decreased according to the number of approved transactions with priority.

In this manner, a priority granting system (the information processing system) according to the present embodiment gives a miner who has created a new block including a transaction with priority a mining reward larger than an original mining reward. With this configuration, the priority granting system performs a process of preferentially including a transaction with priority in a block so as to make sure this process is not disadvantageous to miners, and gives miners a motivation for preferentially including a transaction with priority in a new block. Accordingly, the priority granting system makes it easier to have an agreement to use the mining program according to the present embodiment from a miners' community.

The node device 300 of a miner who has approved a transaction with priority creates a Coinbase transaction for receiving a reward larger than a normal mining reward according to the number of approved transactions with priority and publicizes the Coinbase transaction.

Since mining is performed on a block in a state where a Coinbase transaction is included therein in advance, the Coinbase transaction is always approved. When a new block including a Coinbase transaction is approved by other nodes in the network, while a mining reward larger than a normal mining reward is given to a miner, a Coinbase transaction in which a mining reward within a range agreed in advance is approved. Accordingly, the miner can obtain a mining reward for approving a transaction with priority. On the other hand, a Coinbase transaction in which an amount of reward exceeding a range agreed in a network is described is not approved by other nodes in the network and the miner cannot obtain a mining reward.

Further, when a transaction is unlikely to be approved due to network congestion, for example, it is possible to configure that the priority selling device 20 receives an additional credit of legal tender from a user to publicize once again a transaction with priority to which a further premium is added on.

For example, the priority selling device 20 additionally writes a premium price added on a normal mining reward in a transaction acquired from a user.

The priority selling device 20 newly creates a transaction with priority to which an electronic signature of a priority seller as well as a premium price are added and publicizes the transaction.

The priority selling device 20 newly creates a transaction with priority that is a transaction to which an electronic signature of a priority seller as well as a premium price are added and publicizes the transaction.

A transaction with priority previously publicized is discarded when a new transaction with priority is publicized.

The priority granting system according to the present embodiment is described in detail.

In the following descriptions, for ease of explanations, it is assumed that output of each transaction in a remitting process via a blockchain includes one output and descriptions on a process of referencing output according to Index are omitted. Further, it is assumed that a P2PKH is used as a transaction script.

First Example

In a first example, on behalf of a user who performs remittance, the priority selling device 20 publicizes a transaction with priority on a network.

FIG. 3 is an explanatory diagram of a flow of a priority granting process in the first example. At step (11), a system user pays cash and the like as legal tender to a priority seller who manages the priority selling device 20. Alternatively, the user may make a payment with crypto-assets. The sending amount to the priority selling device 20 is an amount corresponding to a transaction fee and can be set arbitrarily by the priority selling device 20. For example, the amount may be changed according to the number of transactions approved on a previous day. Further, for example, on the day following a day where 100 priorities are purchased, price discount of a certain amount or a certain percentage may be made.

Payment in cash and the like is not made directly to the priority selling device 20, and it is made to a priority seller via agency payment services and the like at a convenience store, for example. Payment in cash and the like may be money transfer to a seller's bank account, payment by credit card, or remittance of crypto-assets. Note that payment in cash and the like may be made directly to the priority seller.

The user may pay a certain amount of money to the priority seller in advance and a transaction fee is debited from the balance each time an electronic signature is issued to obtain priority. Further, the user may pay an amount of money corresponding to a transaction fee to the priority seller each time an electronic signature is issued to obtain priority.

As step (12), the user creates a transaction TxA by using a terminal device (the user device of the user himself and transmits the created transaction TxA to the priority selling device 20.

At step (13), the priority selling device 20 generates an electronic signature Sig_A including a value obtained by encrypting the transaction TxA or a hash of the transaction TxA using a private key Prk_A of the priority seller.

At step (14), the priority selling device 20 publicizes a transaction TxP with priority in which the electronic signature Sig_A and a public key Puk_A of the priority seller as a signature verification key of the electronic signature Sig_A are given to the transaction TxA on a blockchain (the network 30). When the public key Puk_A is included in a node program (the node device 300 holds the public key Puk_A in a memory unit in advance), the transaction TxP with priority does not need to include the public key Puk_A.

The transaction TxP with priority includes an address of a sending destination in ScriptPubKey. Further, the transaction TxP with priority includes an electronic signature of the user and a public key of the user in ScriptSig.

For example, the electronic signature Sig_A of the priority seller and the public key Puk_A of the priority seller may be described at the end of transaction data of the transaction TxP with priority. The electronic signature Sig_A and the public key Puk_A are not used to generate transaction hashes (transaction IDs) and electronic signatures. As far as it is possible not to use the electronic signature Sig_A and the public key Puk_A to generate transaction hashes and electronic signatures, the electronic signature Sig_A and the public key Puk_A may be described at an arbitrary position in the transaction TxP with priority.

When the electronic signature Sig_A and the public key Puk_A are described in ScriptSig of the transaction TxP with priority, the transaction hash is changed from the transaction TxA. Further, when the electronic signature Sig_A and the public key Puk_A are described in OP_RETURN of the transaction TxP with priority, signature subject data is changed so that the electronic signature of the user included in ScriptSig becomes invalid.

To avoid such a problem, the priority selling device 20 describes the electronic signature Sig_A and the public key Puk_A at the end of transaction data, such that the electronic signature Sig_A and the public key Puk_A are not subjected to transaction hash calculation.

As described later, when the public key Puk_A is included in a node program (the node device 300 holds the public key Puk_A in a memory unit in advance), the transaction TxP with priority does not need to include the public key Puk_A.

At step (15), the node device 300 verifies a publicized transaction TxP with priority. A verifying process performed by the node device 300 includes a process of verifying an electronic signature described in an unapproved transaction memorized in a memory pool by using the public key Puk_A. As a result of verification, the node device 300 confirms that an unapproved transaction to which the electronic signature Sig_A of the priority seller is given is the transaction TxP with priority.

At step (16), the node device 300 creates a Coinbase transaction for gaining a mining reward. Subsequently, the node device 300 selects a transaction to be included in a block to build a Merkle tree, and then creates block data including a Merkle root.

When selecting a transaction to be included in a block, the node device 300 preferentially include the transaction TxP with priority over transactions to which the electronic signature Sig_A of the priority seller is not given.

At step (17), the node device 300 performs mining with regard to a block.

At step (18), the node device 300 having succeeded in mining publicizes a block including a Coinbase transaction and the transaction TxP with priority on a network.

The electronic signature and the signature verification key of the priority seller are added to the end of the transaction TxP with priority as described above.

It is also possible to configure that the priority selling device 20 does not constitute any transaction TxP with priority and the electronic signature and the signature verification key of the priority seller and the transaction TxA are publicized separately.

The node device 300 may hold the signature verification key (public key) Puk_A of the priority seller in a memory unit in advance. In this case, the priority selling device 20 does not need to publicize the signature verification key (public key) Puk_A along with the transaction TxP with priority.

Figure 4:
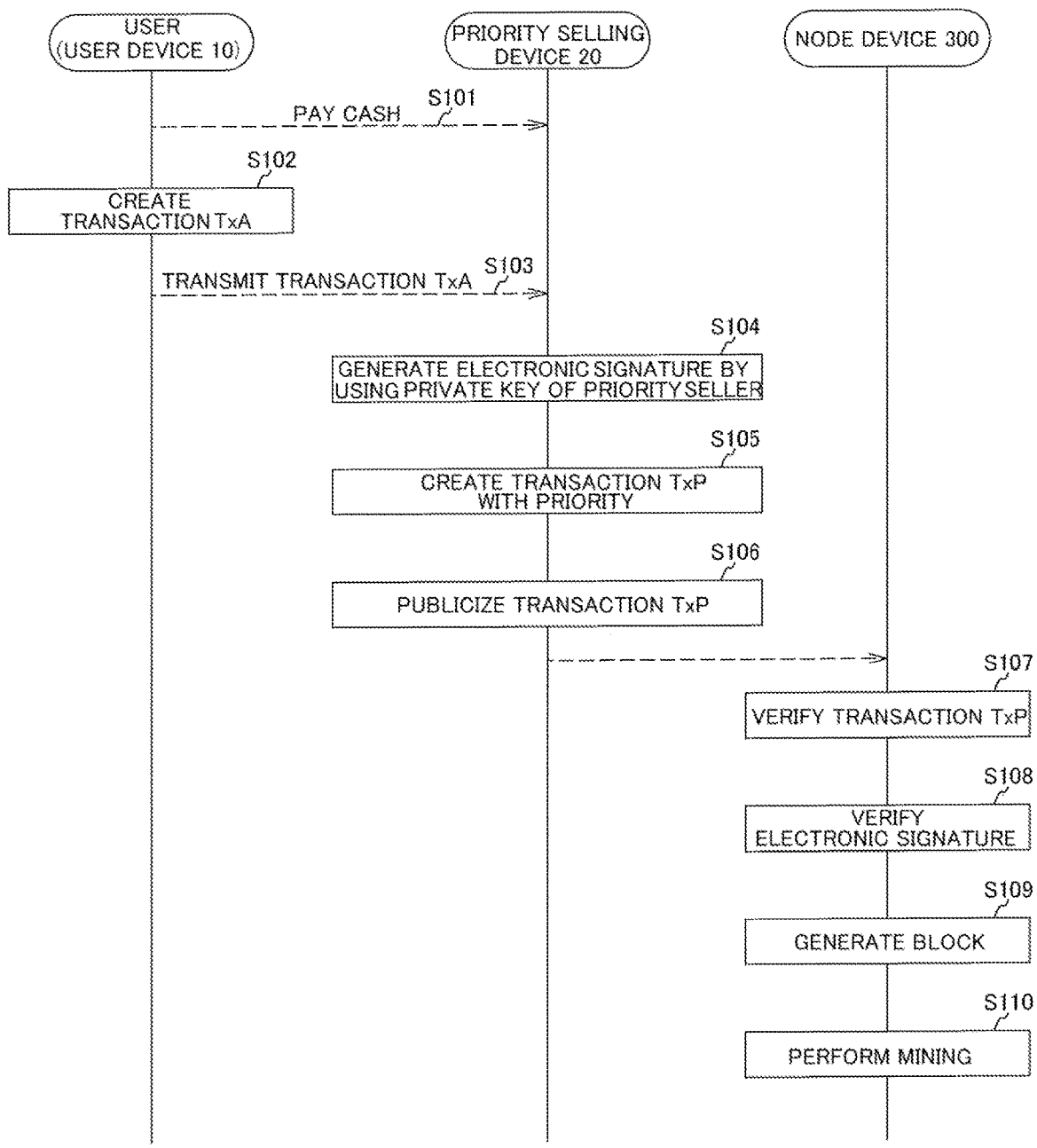
FIG. 4 is a flowchart for explaining the priority granting process described with reference to FIG. 3.

FIG. 4 is a flowchart for explaining the priority granting process described with reference to FIG. 3.

At Step S101, a user pays cash to a seller.

At Step S102, the user device 10 creates the transaction TxA.

At Step S103, the user device 10 transmits the transaction TxA to the priority selling device 20.

At Step S104, the priority selling device 20 creates the electronic signature Sig_A by using the transaction TxA and the private key Prk_A of a priority seller.

At Step S105, the priority selling device 20 creates a sending transaction to which the electronic signature Sig_A is given.

At Step S106, the priority selling device 20 publicizes the transaction TxP with priority to which the created electronic signature Sig_A is given on the network 30.

At Step S107, the node device 300 verifies the transaction TxP with priority that is publicized on the network 30 and memorized in a memory pool.

At Step S108, the node device 300 verifies an electronic signature given to the transaction TxP with priority by using the public key Puk_A of the priority seller.

At Step S109, the node device 300 generates a block including the transaction TxP with priority and a Coinbase transaction. When an unapproved transaction memorized in a memory pool includes the transaction TxP with priority, the node device 300 preferentially includes in a block the transaction TxP with priority over transactions other than the transaction TxP with priority.

At Step S110, the node device 300 performs mining. When the mining is successful, the node device 300 publicizes a block including a Coinbase transaction and the transaction TxP with priority on the network 30.

Second Example

A second example is a modification of the first example. In the second example, the priority selling device 20 does not publicize a transaction with priority, but user publicizes a transaction with priority by using the user device 10 instead. Further, similarly to the first embodiment, the second embodiment may employ a configuration in which an electronic signature and a public key of a priority seller are described at the end of a transaction with priority.

Figure 5:
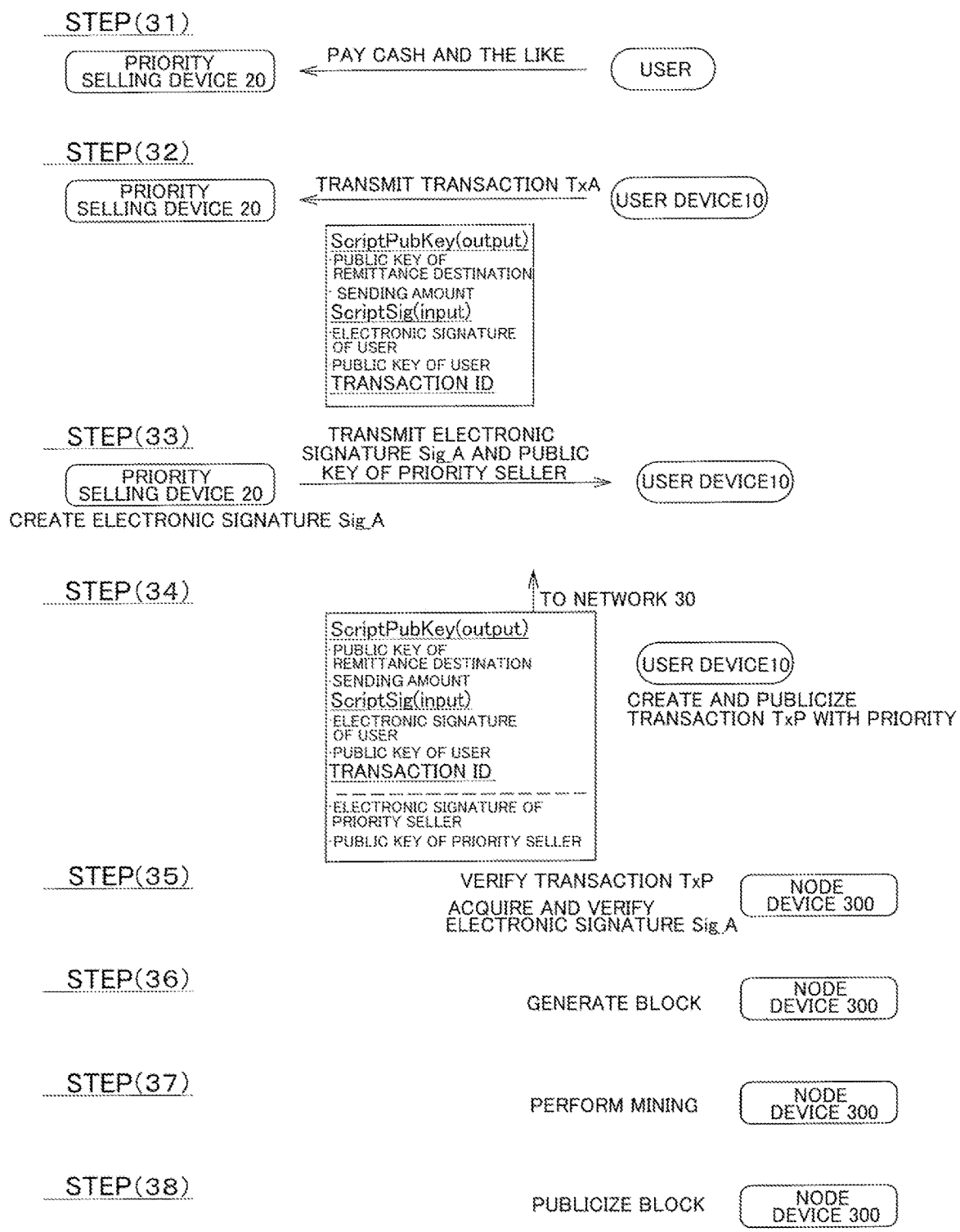
FIG. 5 is an explanatory diagram of a flow of a priority granting process in a second example.

FIG. 5 is an explanatory diagram of a flow of a priority granting process in the second example.

At step (31), a system user pays a price with a corresponding worth of a transaction fee to a priority seller who manages the priority selling device 20. Payment of a price with a corresponding worth of a transaction fee made by a system user is, for example, a payment made by using a process equivalent to the payment method in the first embodiment.

At step (32), the user creates the transaction TxA and transmits the created transaction TxA to the priority selling device 20 by using a terminal device (the user device 10) of the user himself.

At step (33), the priority selling device 20 generates an electronic signature Sig_A including a value obtained by encrypting the transaction TxA or a hash of the transaction TxA by using the private key Prk_A of the priority seller, and then transmits the electronic signature Sig_A to the user device 10.

The priority selling device 20 also transmits the public key Puk_A as a signature verification key of the electronic signature Sig_A to the user device 10. As described later, when the public key Puk_A is included in a node program (the node device 300 holds the public key Puk_A in a memory unit), the priority selling device 20 does not need to send the public key Puk_A.

At step (34), the user device 10 publicizes a transaction TxP with priority in which the electronic signature Sig_A received from the priority selling device 20 and a public key Puk_A of the priority seller as a signature verification key of the electronic signature Sig_A are given to the transaction TxA on a blockchain (the network 30).

The transaction TxP with priority includes an address of a sending destination in ScriptPubKey. Further, the transaction TxP with priority includes an electronic signature of the user and a public key of the user in ScriptSig.

Due to the reasons same as those described above, the electronic signature Sig_A and the public key Puk_A are described at the end of transaction data of the transaction TxP with priority. Further, the electronic signature Sig_A and the public key Puk_A are not subjected to transaction hash (transaction ID) calculation.

At step (35), the node device 300 verifies a publicized transaction TxP with priority.

The verifying process performed by the node device 300 includes a process of verifying an electronic signature described in an unapproved transaction memorized in a memory pool by using the public key Puk_A of the priority seller. As a result of verification, the node device 300 confirms that an unapproved transaction to which the electronic signature Sig_A of the priority seller is given is the transaction TxP with priority.

At step (36), the node device 300 creates a Coinbase transaction for gaining a mining reward. Subsequently, the node device 300 selects a transaction to be included in a block to build a Merkle tree, and then creates block data including a Merkle root.

When selecting a transaction to be included in a block, the node device 300 preferentially selects the transaction TxP with priority over transactions to which the electronic signature Sig_A of the priority seller is not given.

At step (37), the node device 300 performs mining with regard to a block.

At step (38), the node device 300 having succeeded in mining publicizes a block including a Coinbase transaction and the transaction TxP with priority on a network.

The electronic signature Sig_A and the signature verification key (public key) Puk_A of the priority seller are described at the end of the transaction TxP with priority as described above.

It is possible to configure such that the user device 10 does not constitute any transaction TxP with priority but publicize the electronic signature Sig_A and the public key Puk_A of the priority seller and the transaction TxA separately.

The node device 300 may hold the public key Puk_A of the priority seller in a memory unit in advance. In this case, the priority selling device 20 does not need to transmit the public key Puk_A to the user device 10 and the user device does not need to publicize the public key Puk_A along with the transaction TxP with priority.

Figure 6:
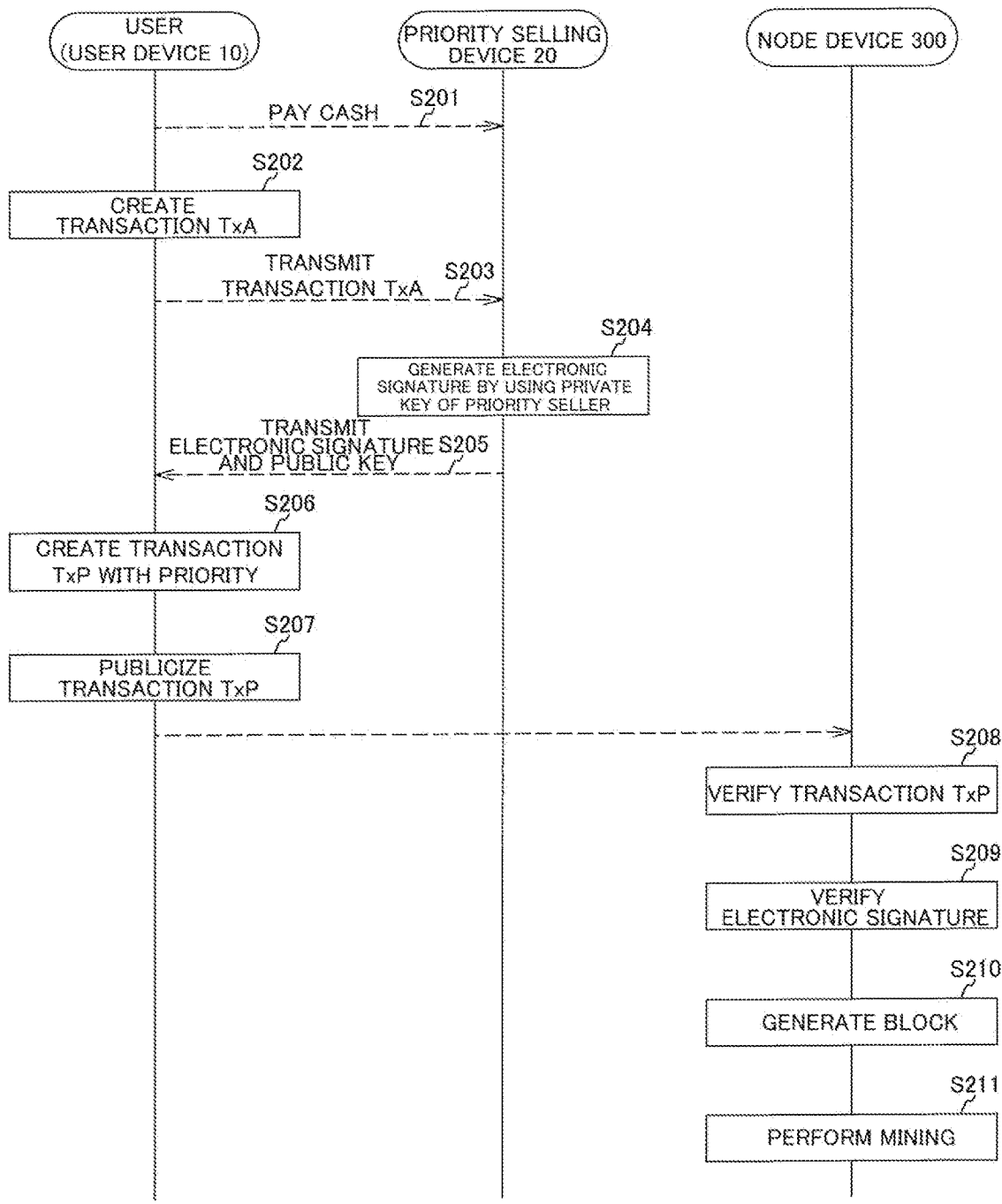
FIG. 6 is a flowchart for explaining the priority granting process described with reference to FIG. 5.

FIG. 6 is a flowchart for explaining the priority granting process described with reference to FIG. 5.

In the following descriptions, it is assumed that a P2PKH is used as a transaction script.

At Step S201, a user pays cash to a seller.

At Step S202, the user device 10 creates the transaction TxA.

At Step S203, the user device 10 transmits the created transaction TxA to the priority selling device 20.

At Step S204, the priority selling device 20 creates the electronic signature Sig_A by using the transaction TxA and the private key Prk_A of a priority seller.

At Step S205, the priority selling device 20 transmits the created electronic signature Sig_A to the user device 10.

At Step S206, the user device 10 creates the transaction TxP with priority to which the electronic signature Sig_A is given.

At Step S207, the user device 10 publicizes the transaction TxP on the network 30.

At Step S208, the node device 300 verifies the transaction TxP with priority that is publicized on the network 30 and memorized in a memory pool.

At Step S209, the node device 300 verifies an electronic signature given to the transaction TxP with priority.

At Step S210, the node device 300 generates a block including the transaction TxP with priority and a Coinbase transaction. When an unapproved transaction memorized in a memory pool includes the transaction TxP with priority, the node device 300 preferentially includes in a block the transaction TxP with priority over transactions other than the transaction TxP with priority.

At Step S211, the node device 300 performs mining. When the mining is successful, the node device 300 publicizes a block including a Coinbase transaction and the transaction TxP with priority on the network 30.

Third Example

A user may make a payment of a price with a corresponding worth of a transaction fee to an agent seller as an agent (agency) of a priority seller instead of making a payment to a priority seller.

FIG. 7 is an explanatory diagram of a flow of a priority granting process in a third example.

At step (51), the priority selling device 20 creates the electronic signature Sig_A (first electronic signature) by using a private key (first private key) of a priority seller and transmits the created electronic signature Sig_A to the agent selling device 40.

At step (52), a user pays cash and the like to the agent selling device 40 (agent seller), and at step (53), the user transmits the transaction TxA to the agent selling device 40.

Upon payment of a price and transmission of the transaction TxA by the user, at step (54), the agent selling device 40 generates an electronic signature Sig_B (second electronic signature) including a value obtained by encrypting the transaction TxA or a hash of the transaction TxA by using a private key Prk_B (second private key) of the agent seller.

At step (55), the agent selling device 40 publicizes a transaction TxP with priority in which the electronic signature Sig_A of the priority seller, the electronic signature Sig_B of the agent seller, and a public key Puk_B of the agent seller are given to the transaction TxA on the network 30.

The public key Puk_B of the agent seller is paired with the private key Prk_B of the agent seller and the public key Puk_B becomes a signature verification key (second verification key) for verifying the electronic signature Sig_B.

The transaction TxP with priority includes an address of a sending destination in ScriptPubKey.

Further, the transaction TxP with priority includes an electronic signature of the user and a public key of the user in ScriptSig.

The electronic signature Sig_A of the priority seller, the electronic signature Sig_B of the agent seller, and the public key Puk_B of the agent seller may be, for example, described at the end of transaction data of the transaction TxP with priority. Further, the electronic signature Sig_A, the electronic signature Sig_B, and the public key Puk_B are not used to generate transaction hashes and electronic signatures. As far as it is possible not to use the electronic signature Sig_A, the electronic signature Sig_B, and the public key Puk_B for generating transaction hashes and electronic signatures, the electronic signature Sig_A, the electronic signature Sig_B, and the public key Puk_B may be described at an arbitrary position in the transaction TxP with priority.

When the electronic signature Sig_A of the priority seller, the electronic signature Sig_B of the agent seller, and the public key Puk_B of the agent seller are described in ScriptSig of the transaction TxP with priority, the transaction hash is changed from the transaction TxA. Further, when the electronic signature Sig_A and the public key Puk_A are described in OP_RETURN of the transaction TxP with priority, signature subject data is changed so that the electronic signature of the user included in ScriptSig becomes invalid.

To avoid such a problem, the electronic signature Sig_A of the priority seller, the electronic signature Sig_B of the agent seller, and the public key Puk_B of the agent seller are described at the end of transaction data and are not subjected to transaction hash calculation.

At step (56), the node device 300 performs a process of verifying a plurality of electronic signatures given to an unapproved transaction that is publicized on the network 30 and memorized in a memory pool of the node device 300.

The node device 300 holds the public key Puk_A that is paired with the private key Prk_A of the priority seller as a signature verification key (first verification key) for verifying the electronic signature Sig_A of the priority seller. Alternatively, the public key Puk_A may be given to the transaction TxP with priority.

The node device 300 verifies whether the electronic signature Sig_A of the priority seller is included in an electronic signature given to an unapproved transaction by using the public key Puk_A of the priority seller.

When a fact that the electronic signature Sig_A of the priority seller is included in an unapproved transaction is verified, the node device 300 uses the public key Puk_B of the agent seller given to the unapproved transaction to verify whether the electronic signature Sig_B of the agent seller is included in an electronic signature given to the unapproved transaction.

When a fact that the electronic signature Sig_B of the agent seller is included in an electronic signature given to the unapproved transaction is verified, the node device 300 confirms that the unapproved transaction is the transaction TxP with priority to which priority is granted by the priority selling device 20.

Thereafter, similarly to the cases at steps (16) to (18) in FIG. 3, the node device 300 generates a block preferentially including the transaction TxP with priority over transactions to which the electronic signature Sig_B of the agent seller is not given. Subsequently, the node device 300 having succeeded in mining publicizes the generated block on a distributed ledger.

Similarly to the cases described with reference to FIG. 5 and FIG. 6, the electronic signature Sig_A of the priority seller, the electronic signature Sig_B of the agent seller, and the public key Puk_B of the agent seller may be transmitted to the user device 10.

Subsequently, the user device 10 may publicize on a blockchain (the network 30), a transaction TxP with priority to which the electronic signature Sig_A of the priority seller, the electronic signature Sig_B of the agent seller, and a public key paired with the private key Prk_B of the agent seller are given.

Figure 8:
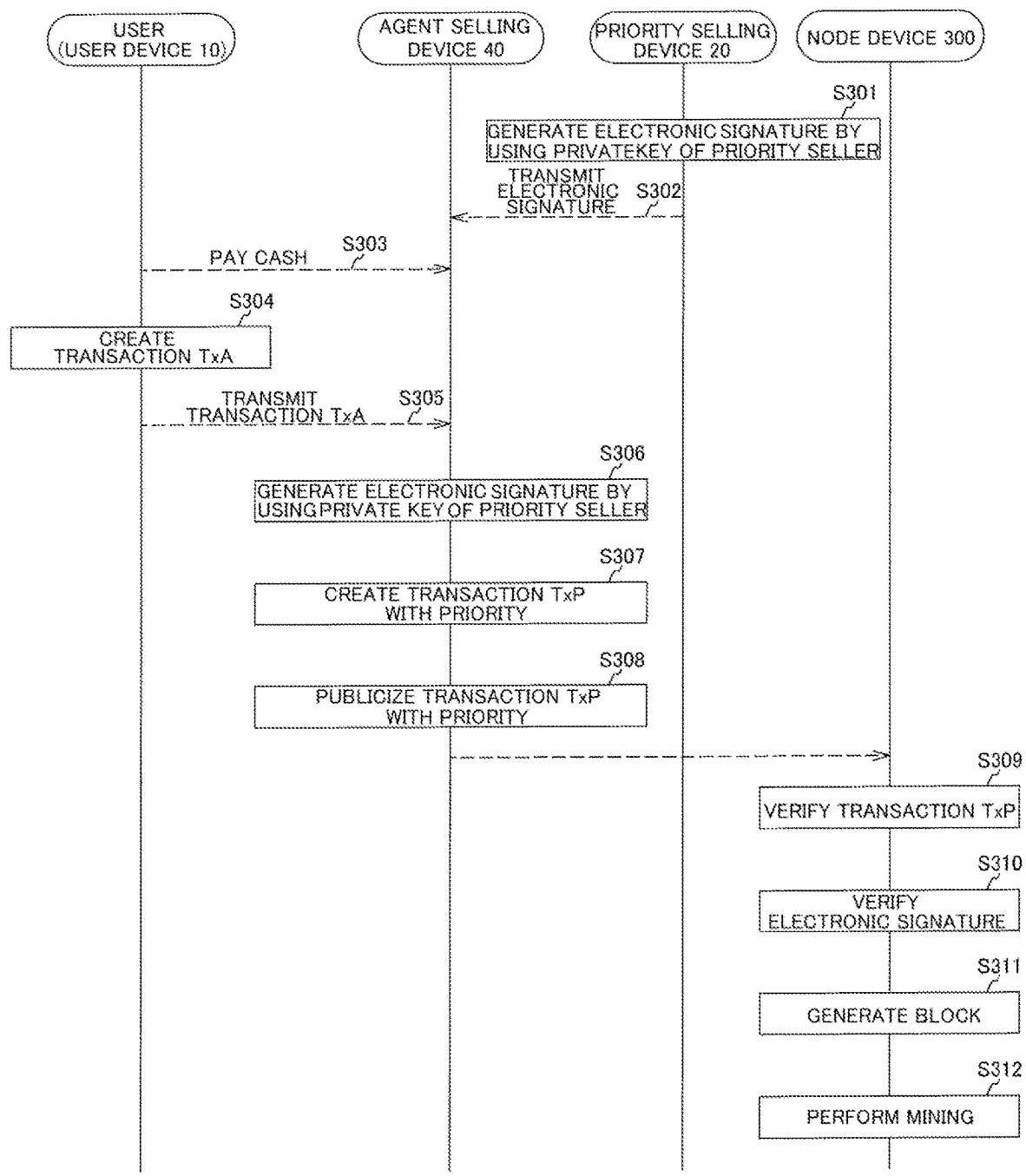
FIG. 8 is a flowchart for explaining the priority granting process described with reference to FIG. 7.

FIG. 8 is a flowchart for explaining the priority granting process described with reference to FIG. 7.

In the following descriptions, it is assumed that a P2PKH is used as a transaction script.

At Step S301, the priority selling device 20 creates the electronic signature Sig_A with the private key Prk_A of a priority seller.

At Step S302, the priority selling device 20 transmits the electronic signature Sig_A to the agent selling device 40.

At Step S303, a user pays cash to a seller.

At Step S304, the user device 10 creates the transaction TxA.

At Step S305, the user device 10 transmits the created transaction TxA to the agent selling device 40.

At Step S306, the agent selling device 40 generates the electronic signature Sig_B by using the transaction TxA and the private key Prk_B of the agent seller.

At Step S307, the agent selling device 40 creates a transaction TxP with priority to which the electronic signature Sig_A and the electronic signature Sig_B are given.

At Step S308, the agent selling device 40 publicizes the transaction TxP with priority to which the electronic signature Sig_A and the electronic signature Sig_B are given on the network 30.

At Step S309, the node device 300 verifies the transaction TxP with priority that is publicized on the network 30 and memorized in a memory pool.

At Step S310, the node device 300 verifies an electronic signature given to the transaction TxP with priority.

At Step S311, the node device 300 generates a block including the transaction TxP with priority and a Coinbase transaction. When an unapproved transaction memorized in a memory pool includes the transaction TxP with priority, the node device 300 preferentially includes in a block the transaction TxP with priority over transactions other than the transaction TxP with priority.

At Step S312 the node device 300 performs mining. When the mining is successful, the node device 300 publicizes a block including a Coinbase transaction and the transaction TxP with priority on the network 30.

FIG. 9 is an explanatory diagram of a flow of another processing in the priority granting process in the third example.

In the example of FIG. 9, differently from that of FIG. 7, instead of giving the public key Puk_B of an agent seller to the transaction TxP as a signature verification key, the public key Puk_B is distributed to the node device 300 separately.

At step (71), the priority selling device 20 generates the electronic signature Sig_A (first electronic signature) by using a private key (first private key) of a priority seller and transmits the created electronic signature Sig_A to the agent selling device 40.

At step (72), a user pays cash and the like to the agent selling device 40 (agent seller), and at step (73), the user transmits the transaction TxA to the agent selling device 40.

Upon payment of a price and transmission of the transaction TxA, at step (74), the agent selling device 40 generates the electronic signature Sig_B (second electronic signature). The electronic signature Sig_B includes a value obtained by encrypting the transaction TxA or a hash of the transaction TxA by using the private key Prk_B (second private key) of the agent seller.

At step (75), the agent selling device 40 transmits a public key of the agent seller to which the electronic signature Sig_A of the priority seller is given to the node device 300.

The node device 300 holds the public key Puk_A that is paired with the private key Prk_A of the priority seller as a signature verification key for verifying the electronic signature Sig_A of the priority seller. Alternatively, the public key Puk_A may be given to the transaction TxP with priority.

At step (76), the node device 300 uses the public key Puk_A of the priority seller to verify an electronic signature given to the public key Puk_B of the agent seller transmitted from the node device 300.

The node device 300 memorizes, in a memory unit, a public key Puk_B that has been confirmed as a public key Puk_B of the agent seller to which the electronic signature Sig_A of the priority seller is given and that proves priority.

At step (77), the agent selling device 40 publicizes the transaction TxP with priority in which the electronic signature Sig_B of the agent seller is given to the transaction TxA on the network 30.

That is, the transaction TxP with priority includes an address of a sending destination in ScriptPubKey. Further, the transaction TxP with priority includes the electronic signature Sig_B of the agent seller, an electronic signature of the user, and a public key of the user in ScriptSig. The node device 300 performs a process of verifying an electronic signature given to an unapproved transaction that is publicized on the network 30 and memorized in a memory pool.

The node device 300 verifies whether the electronic signature Sig_B of the agent seller is included in an electronic signature given to an unapproved transaction by using the public key Puk_B of the agent seller verified at step (76).

When a fact that the electronic signature Sig_B of the agent seller is included in an electronic signature is verified, the node device 300 confirms that the unapproved transaction is the transaction TxP with priority to which priority is granted by the priority selling device 20.

Thereafter, similarly to the cases at steps (16) to (18) in FIG. 3, the node device 300 generates a block in which the transaction TxP with priority is preferentially included over transactions to which the electronic signature Sig_B of the agent seller is not given. Subsequently, the node device 300 having succeeded in mining publicizes the generated block on a distributed ledger.

Also in this case, similarly to the cases described with reference to FIG. 5 and FIG. 6, the electronic signature Sig_A of the priority seller and the electronic signature Sig_B of the agent seller may be transmitted to the user device 10. Subsequently, the user device 10 may publicize a transaction TxP with priority to which the electronic signature Sig_A of the priority seller and the electronic signature Sig_B of the agent seller are given on a blockchain (the network 30).

The timing of transmitting by the agent selling device 40 a public key of the agent seller to which the electronic signature Sig_A of the priority seller is given is not limited to that described above.

For example, it suffices that the public key of the agent seller to which the electronic signature Sig_A is given is transmitted to the node device 300 after a payment in cash is made by a user and by the time verification of the transaction TxP is performed by the node device 300.

Verification by the node device 300 of the public key of the agent seller to which the electronic signature Sig_A of the priority seller is given is also the same, and may be conducted after a payment in cash is made by a user and by the time verification of the transaction TxP is performed by the node device 300.

Figure 10:
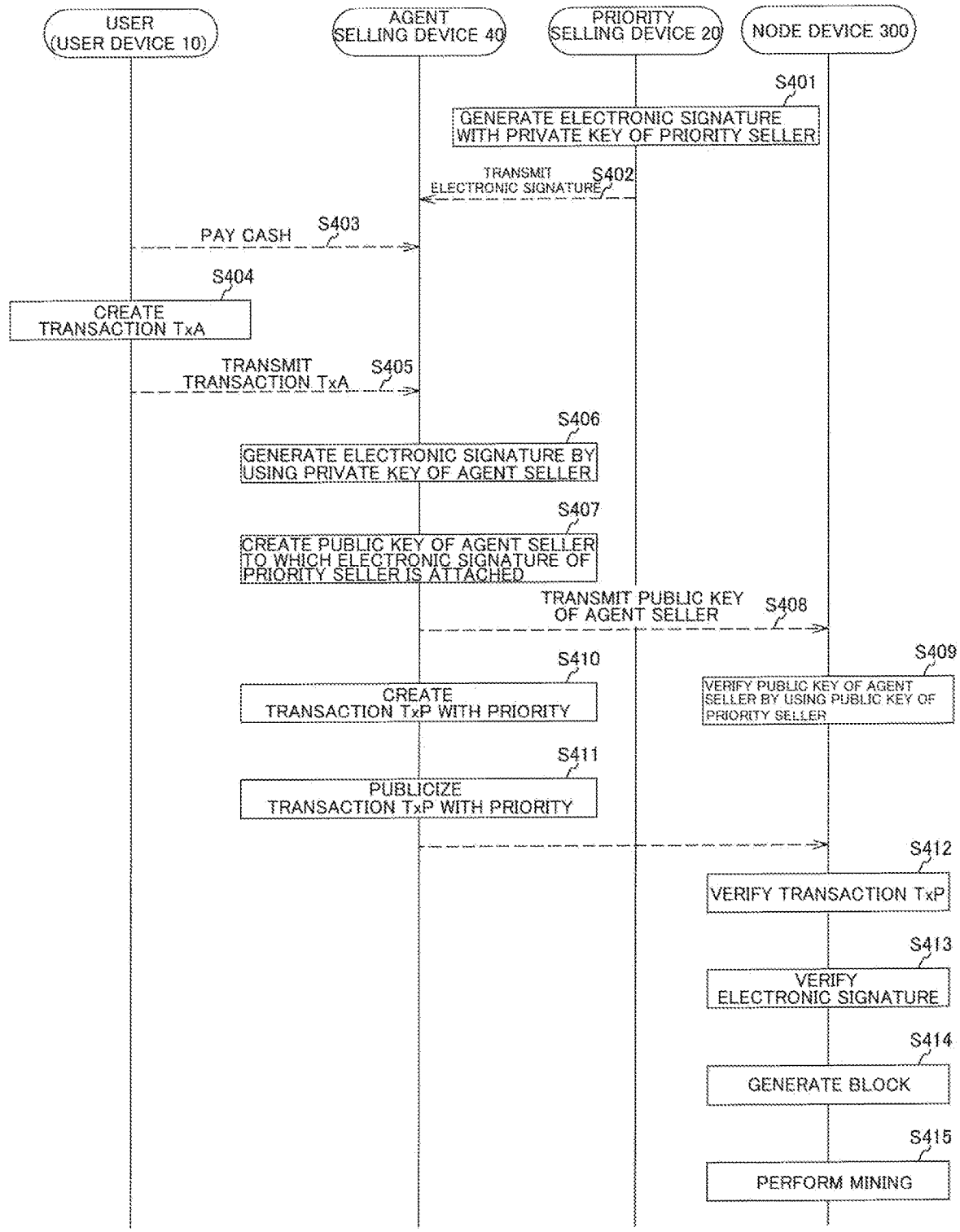
FIG. 10 is a flowchart for explaining the priority granting process described with reference to FIG. 9.

FIG. 10 is a flowchart for explaining the priority granting process described with reference to FIG. 9.

In the following descriptions, it is assumed that a P2PKH is used as a transaction script.

At Step S401, the priority selling device 20 creates the electronic signature Sig_A with the private key Prk_A of a priority seller.

At Step S402, the priority selling device 20 transmits the electronic signature Sig_A to the agent selling device 40.

At Step S403, a user pays cash to a seller.

At Step S404, the user device 10 creates the transaction TxA.

At Step S405, the user device 10 transmits the created transaction TxA to the agent selling device 40.

At Step S406, the agent selling device 40 generates the electronic signature Sig_B with the private key Prk_B of an agent seller.

At Step S407, the agent selling device 40 creates a public key of the agent seller to which the electronic signature Sig_A of the priority seller is given.

At Step S408, the agent selling device 40 transmits the public key of the agent seller to which the electronic signature Sig_A of the priority seller is given to the node device 300.

At Step S409, the node device 300 verifies the electronic signature Sig_A of the priority seller given to the public key of the agent seller with the public key Puk_A of the priority seller.

At Step S410, the agent selling device 40 creates a transaction TxP with priority to which the electronic signature Sig_B of the agent seller is given.

At Step S411, the agent selling device 40 publicizes the transaction TxP with priority to which the electronic signature Sig_B of the agent seller is given on the network 30.

At Step S412, the node device 300 verifies the transaction TxP with priority.

At Step S413, the node device 300 verifies an electronic signature given to the transaction TxP with priority.

At Step S414, the node device 300 generates a block including the transaction TxP with priority and a Coinbase transaction. When an unapproved transaction memorized in a memory pool includes the transaction TxP with priority, the node device 300 preferentially includes in a block the transaction TxP with priority over transactions other than the transaction TxP with priority.

At Step S415, the node device 300 performs mining. When the mining is successful, the node device 300 publicizes a block including a Coinbase transaction and the transaction TxP with priority on the network 30.

A user device, a priority seller device, a node device, and an agent seller device are described.

FIG. 11 to FIG. 14 are functional block diagrams illustrating an example of each device.

Each of the user device 10, the priority selling device 20, and the node device 300 may have one or more of the functions other devices have.

Figure 11:
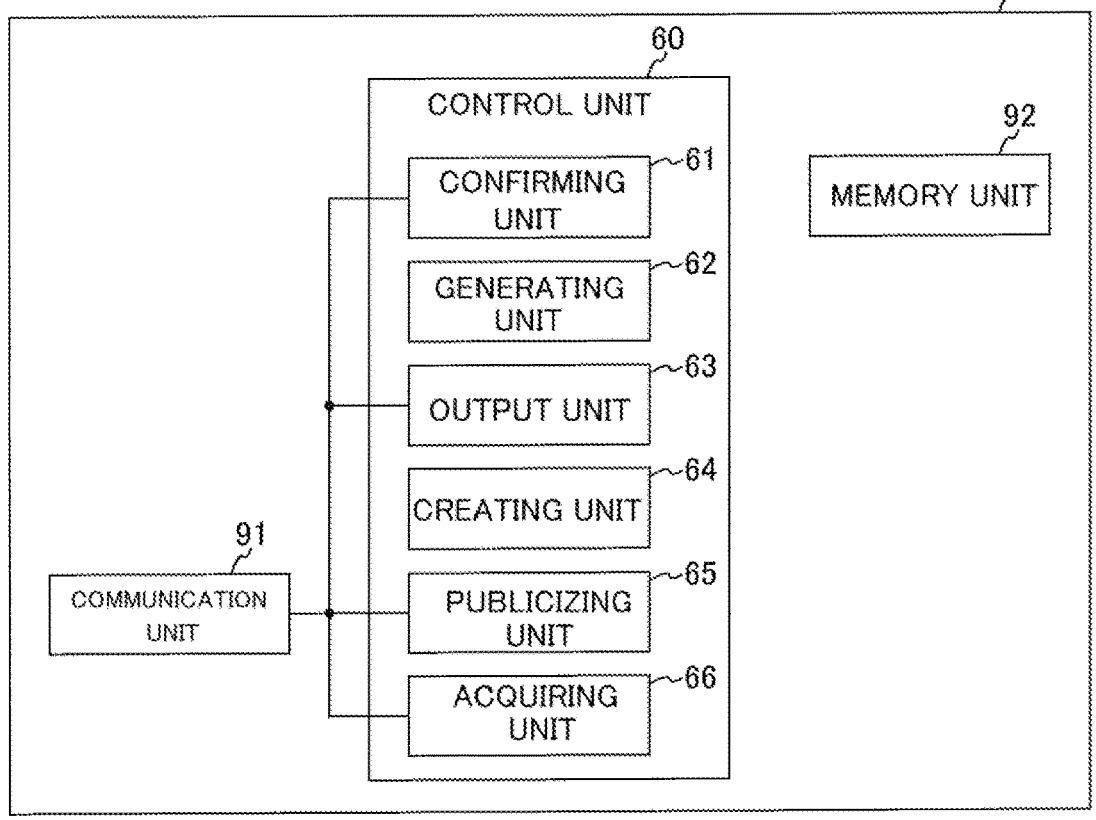
FIG. 11 is a block diagram illustrating functions a priority selling device has.

FIG. 11 is a block diagram illustrating functions the priority selling device 20 has.

With reference to FIG. 11, the functions of the priority selling device 20 are described.

The priority selling device 20 includes a control unit 60, a communication unit 91, and a memory unit 92.

The communication unit 91 connects the priority selling device 20 to a network.

The memory unit 92 memorizes various types of information. The memory unit 92 memorizes a seller program that causes the control unit 60 to function as a confirming unit 61, a generating unit 62, an output unit (a transmitting unit) 63, a creating unit 64, a publicizing unit 65, and an acquiring unit 66.

The control unit 60 includes the confirming unit 61, the generating unit 62, the output unit 63, the creating unit 64, the publicizing unit 65, and the acquiring unit 66.

The confirming unit 61 confirms, for example, a credit of legal tender from a user via external agency payment services and the like.

The generating unit 62 generates the electronic signature Sig_A of a priority seller by using a private key of the priority seller.

The output unit 63 outputs the electronic signature Sig_A and transmits the electronic signature Sig_A to the user via the communication unit 91. Specifically, the output unit 63 transmits an electronic signature in an E-MAIL or the like to the user device 10 via the communication unit 91. Further, the output unit 63 may transmit a transaction TxP with priority in which a signature is given to a transaction TxA received from the user device 10 to the user via the communication unit 91.

The creating unit 64 creates a transaction TxP with priority to which an electronic signature is given.

The publicizing unit 65 publicizes the transaction TxP with priority created by the creating unit 64 on the network 30.

The acquiring unit 66 acquires the transaction TxA from the user device 10.

Figure 12:
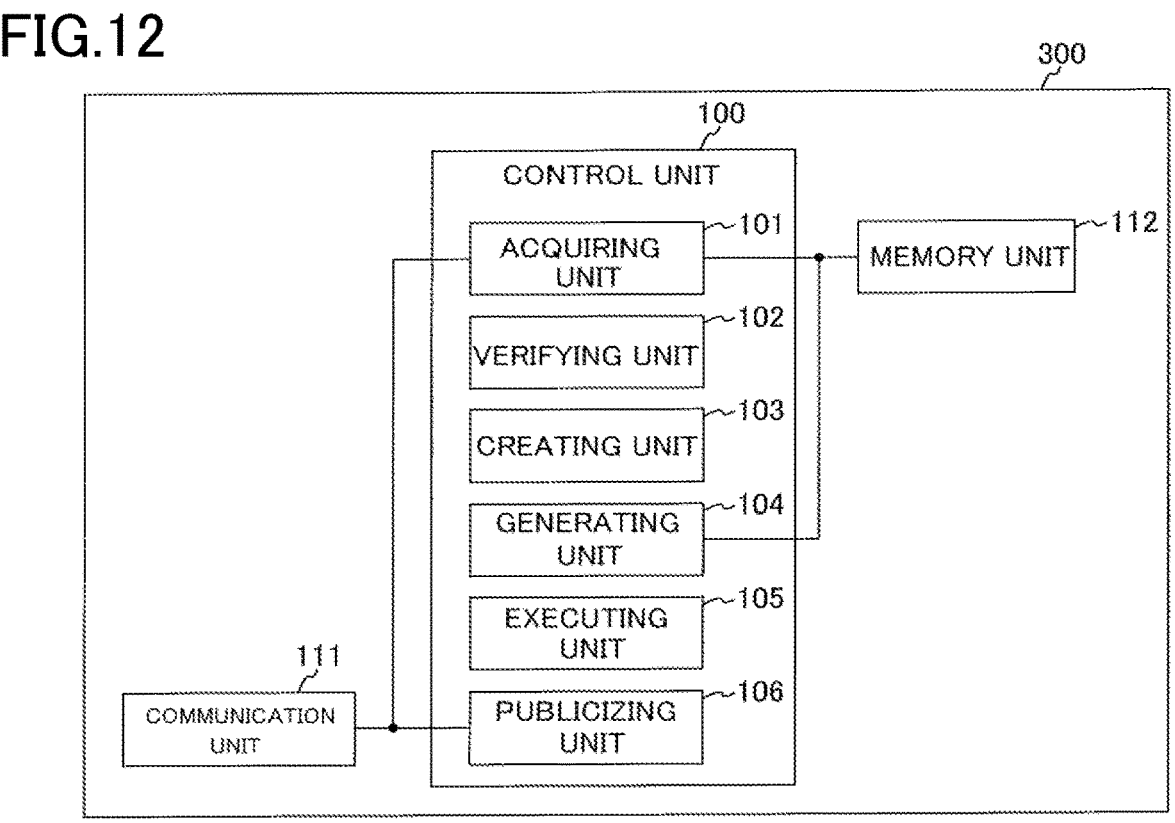
FIG. 12 is a block diagram illustrating functions a node device has.

FIG. 12 is a block diagram illustrating functions the node device 300 has.

With reference to FIG. 12, the functions of the node device 300 are described.

The node device 300 includes a control unit 100, a communication unit 111, and a memory unit 112.

The communication unit 111 connects the priority selling device 20 to a network.

The memory unit 112 memorizes a signature verification key and various types of information. The memory unit 112 memorizes a node program that causes the control unit 100 to function as an acquiring unit 101, a verifying unit 102, a creating unit 103, a generating unit 104, an executing unit 105, and a publicizing unit 106.

The control unit 100 includes the acquiring unit 101, the verifying unit 102, the creating unit 103, the generating unit 104, the executing unit 105, and the publicizing unit 106.

The memory unit 112 memorizes various types of information. The memory unit 112 memorizes, for example, a public key of a priority seller used for verifying an electronic signature of the priority seller.

The memory unit 112 memorizes one or more public keys, and these public keys correspond to transactions with priority issued by priority selling devices 20 of one or more different priority sellers.

The memory unit 112 also includes a memory pool. The memory pool is an area in which unapproved transactions not added to a block are temporarily memorized.

The node device 300 selects transactions to be added to a block from the unapproved transactions accumulated in the memory pool and performs mining to generate a new block.

The acquiring unit 101 acquires transactions from the network 30 and memorizes them in the memory pool.

The verifying unit 102 verifies the transactions memorized in the memory pool.

The verifying unit 102 verifies electronic signatures given to the transactions memorized in the memory pool with public keys as signature verification keys.

Among the transactions memorized in the memory pool, a transaction to which the electronic signature Sig_A corresponding to the public key (signature verification key) Puk_A of the priority seller is a transaction with priority to which an electronic signature of the priority seller is given. This one is selected as a transaction to be preferentially included (approved) in a block.

The creating unit 103 creates a Coinbase transaction for receiving a mining reward when mining is successful.

The generating unit 104 generates a block including a Coinbase transaction. When there is a transaction TxP with priority that has been confirmed by verification performed by the verifying unit 102, the generating unit 104 preferentially includes the transaction TxP with priority in a block.

The executing unit 105 performs mining.

The publicizing unit 106 publicizes a block on a network.

Figure 13:
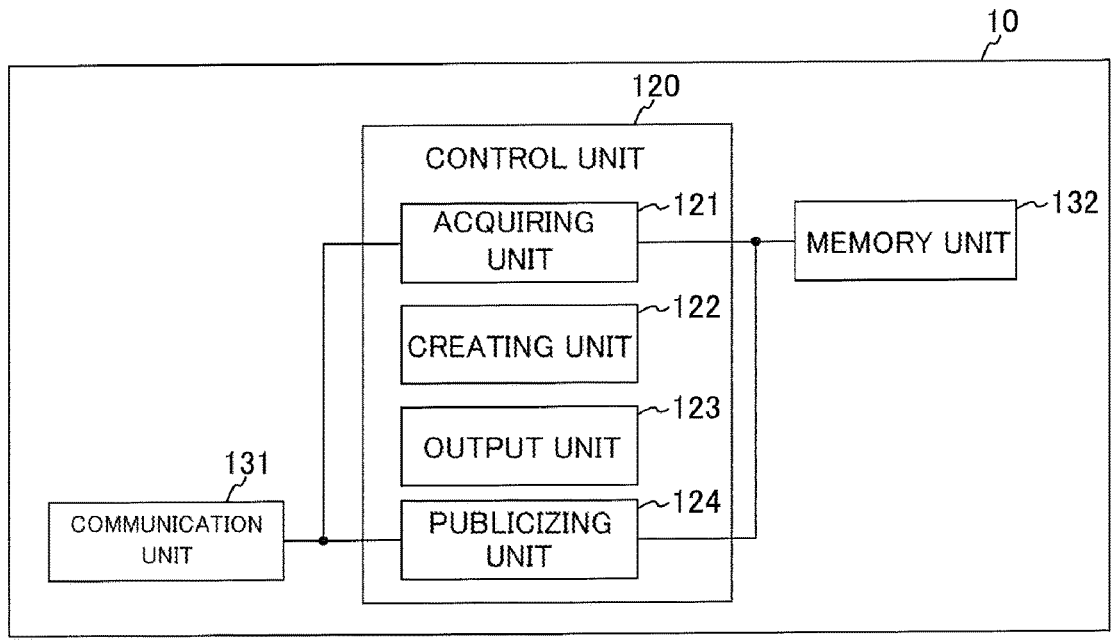
FIG. 13 is a block diagram illustrating functions a user device has.

FIG. 13 is a block diagram illustrating functions a user device has.

With reference to FIG. 13, the functions of the user device 10 are described.

The user device 10 includes a control unit 120, a communication unit 131, and a memory unit 132.

The communication unit 131 connects the user device 10 to a network.

The memory unit 132 memorizes various types of information. The memory unit 132 memorizes a user program that causes the control unit 120 to function as an acquiring unit 121, a creating unit 122, an output unit (a transmitting unit) 123, and a publicizing unit 124.

The control unit 120 includes the acquiring unit 121, the creating unit 122, the output unit 123, and the publicizing unit 124.

The acquiring unit 121 acquires an electronic signature of a priority seller from the priority selling device 20. The acquiring unit 121 may acquire a transaction with priority to which the electronic signature of the priority seller is given from the priority selling device 20.

The creating unit 122 creates a transaction. Further, when an electronic signature is acquired from the priority selling device 20, the creating unit 122 creates a transaction with priority to which an electronic signature is given.

The output unit 123 outputs the transaction created by the creating unit 122 and transmits the transaction to the priority selling device 20 via the communication unit 131.

When the creating unit 122 creates a transaction with priority, the publicizing unit 124 publicizes the transaction with priority on the network 30. Further, when a transaction with priority to which an electronic signature of a priority seller is given is acquired from the priority selling device 20, the publicizing unit 124 may publicize the acquired transaction with priority on the network 30.

Figure 14:
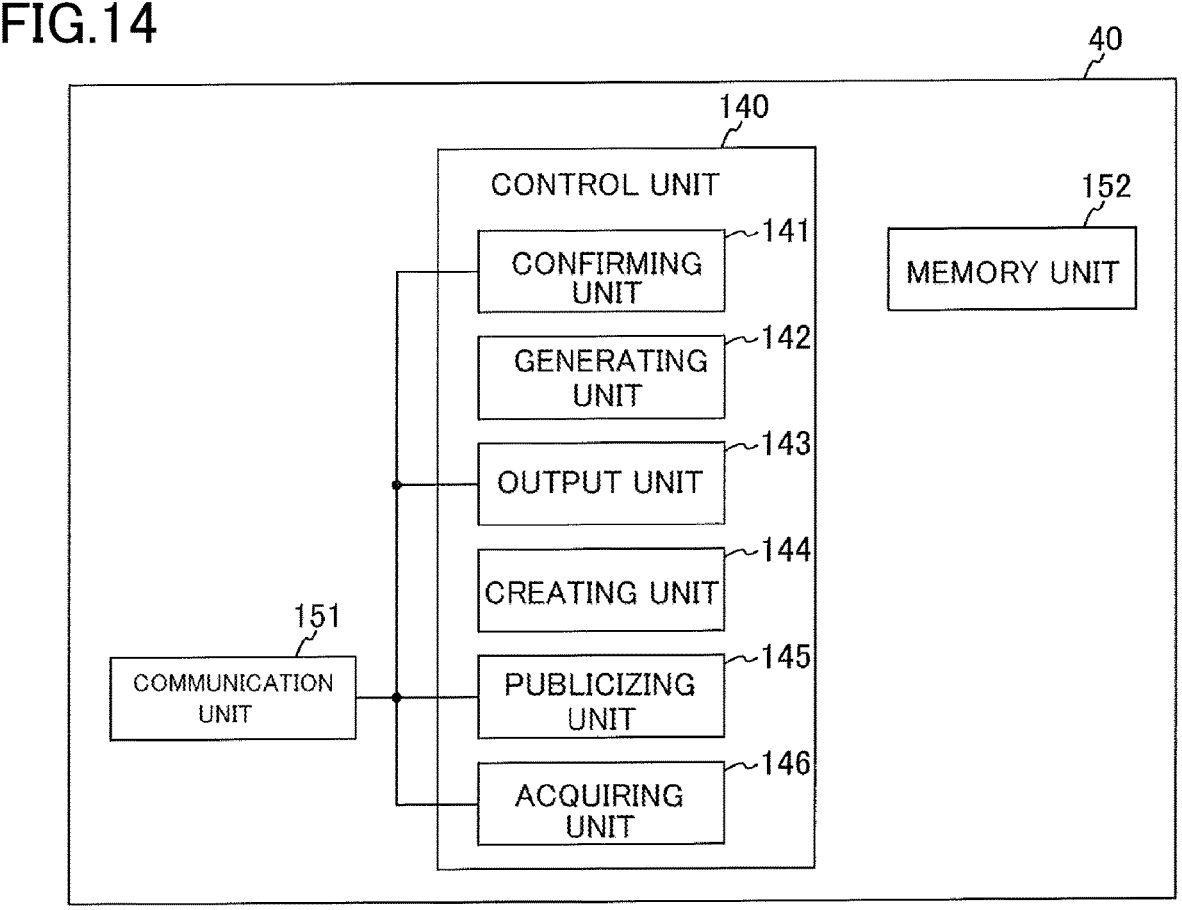
FIG. 14 is a block diagram illustrating functions an agent seller device has.

FIG. 14 is a block diagram illustrating functions an agent seller device has.

The agent seller device 40 includes a control unit 140, a communication unit 151, and a memory unit 152.

The communication unit 151 connects the agent seller device 40 to a network.

The memory unit 152 memorizes various types of information. The memory unit 152 memorizes a seller program that causes the control unit 140 to function as a confirming unit 141, a generating unit 142, an output unit (a transmitting unit) 143, a creating unit 144, a publicizing unit 145, and an acquiring unit 146.

The control unit 140 includes the confirming unit 141, the generating unit 142, the output unit 143, the creating unit 144, the publicizing unit 145, and the acquiring unit 146.

The confirming unit 141 confirms, for example, a credit of legal tender from a user via external agency payment services and the like.

The generating unit 142 generates the electronic signature Sig_B of the agent seller device 40 by using the private key Prk_B of the agent seller device 40.

The output unit 143 outputs the electronic signature Sig_B and transmits the electronic signature Sig_B to the user via the communication unit 151. Specifically, the output unit 143 transmits an electronic signature in an E-MAIL or the like to the user device 10 via the communication unit 151. Further, the output unit 143 may transmit a transaction TxP with priority in which a signature is given to a transaction TxA received from the user device 10 to the user via the communication unit 151.

The creating unit 144 creates a transaction TxP with priority to which an electronic signature is given.

The publicizing unit 145 publicizes the transaction TxP with priority created by the creating unit 144 on the network 30.

The acquiring unit 146 acquires the transaction TxA from the user device 10.

Figure 15:
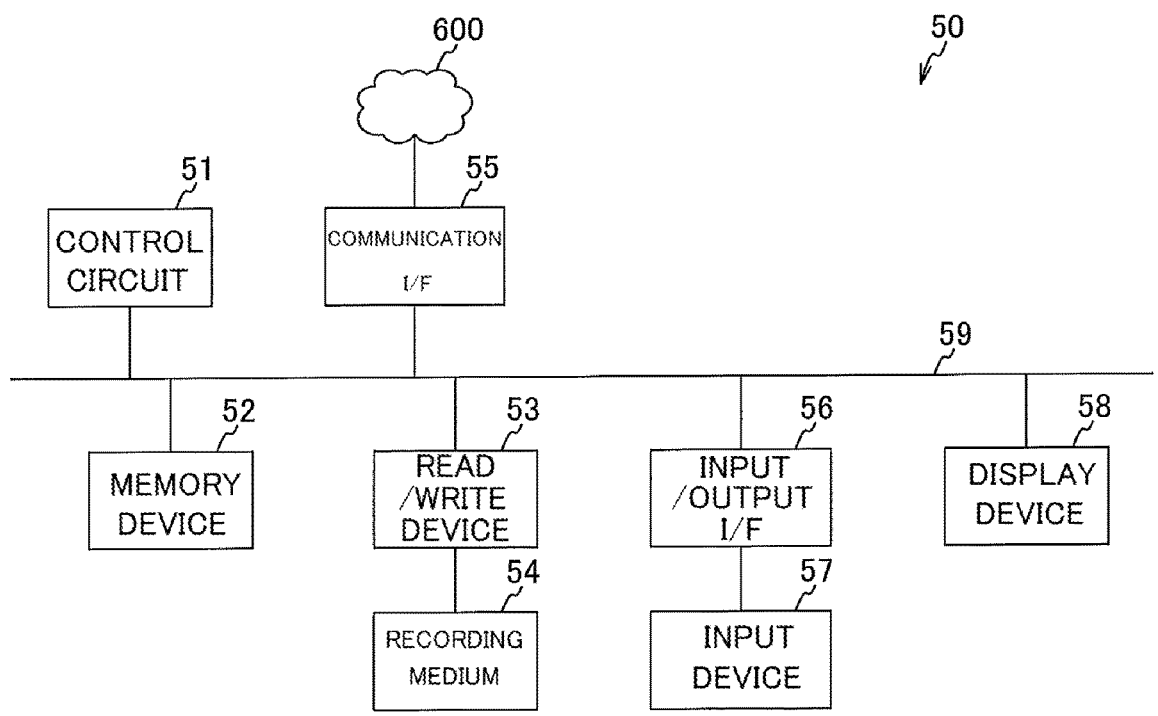
FIG. 15 is a block diagram illustrating an example of a computer apparatus.

FIG. 15 is a block diagram illustrating an example of a computer apparatus.

With reference to FIG. 15, a configuration of a computer apparatus 50 is described.

In FIG. 15, the computer apparatus 50 (The information processing apparatus) includes a control circuit 51, a memory device 52, a read/write device 53, a recording medium 54, a communication interface 55, an input/output interface 56, an input device 57, and a display device 58. The communication interface 55 is connected to a network 600. These constituent elements are connected to one another through a bus 59. The user device 10, the priority selling device 20, and the node device 300 can be constituted by appropriately selecting a part or all of the constituent elements described in the computer apparatus 50.

The control circuit 51 controls the entirety of the computer apparatus 50. The control circuit 51 is, for example, a processor such as a Central Processing Unit (CPU), a Field Programmable Gate Array (FPGA), an Application Specific Integrated Circuit (ASIC), and a Programmable Logic Device (PLD). For example, the control circuit 51 functions as the control unit 60 in FIG. 11. Further, the control circuit 51 functions as the control unit 100 in FIG. 12. The control circuit 51 functions as the control unit 120 in FIG. 13.

The memory device 52 memorizes various types of data. The memory device 52 is, for example, a non-transitory computer-readable recording medium such as a memory such as a Read Only Memory (ROM) and a Random Access Memory (RAM) or a Hard Disk (HD) and a Solid State Drive (SSD). The memory device 52 may memorize a program for causing the control circuit 51 to function as the control units 60, 100, 120, and 130. For example, the memory device 52 functions as the memory unit 92 in FIG. 11. Further, the memory device 52 functions as the memory unit 112 in FIG. 12. The memory device 52 also functions as the memory unit 132 in FIG. 13. Further, the memory device 52 functions as the memory unit 152 in FIG. 14.

When performing a priority granting process, the user device 10, the priority selling device the node device 300, and the agent selling device 40 reads a program memorized in the memory device 52 on a RAM.

By executing the program read on the RAM with the control circuit 51, the priority selling device 20 performs a priority granting process including at least one of a confirming process, a generating process, an output process, a creating process, a publicizing process, and an acquiring process.

Further, by executing the program read on the RAM with the control circuit 51, the node device 300 performs a mining process including at least one of the acquiring process, a verifying process, the generating process, an executing process, the creating process, and the publicizing process.

Further, by executing the program read on the RAM with the control circuit 51, the user device 10 performs a process including at least one of the acquiring process, the generating process, and the publicizing process.

Further, the agent selling device 40 performs a priority granting process including at least one of the confirming process, the generating process, the output process, the creating process, the publicizing process, and the acquiring process.

The program may be memorized in a memory device included in a server on the network 600 as far as the control circuit 51 can access the program via the communication interface 55.

The read/write device 53 is controlled by the control circuit 51 and performs read/write of data in the detachable recording medium 54.

The recording medium 54 stores therein various types of data. The recording medium 54 memorizes, for example, a priority granting process program (including at least one of the seller program, the node program, and the user program). The recording medium 54 is, for example, a nonvolatile memory (non-transitory computer-readable recording medium) such as a Secure Digital (SD) memory card, a Floppy Disk (FD), a Compact Disc (CD), a Digital Versatile Disk (DVD), a Blu-ray (registered trademark) Disk (BD), and a flash memory.

The communication interface 55 communicably connects the computer apparatus 50 to other devices via the network 600.

For example, in FIG. 11, the communication interface 55 functions as the communication unit 91. Further, in FIG. 12, the communication interface 55 functions as the communication unit 111. Furthermore, in FIG. 13, the communication interface 55 functions as the communication unit 131. Further, in FIG. 14, the communication interface 55 functions as the communication unit 151.

The input/output interface 56 is, for example, an interface that is connected to various types of input devices in a detachable manner. The input/output interface 56 communicably connects the various types of input devices connected thereto and the computer apparatus 50. The input/output interface 56 outputs a signal input from the various types of input devices connected thereto to the control circuit 51 via the bus 59. Further, the input/output interface 56 outputs a signal output from the control circuit 51 to an input/output device via the bus 59.

The network 600 is, for example, a LAN, wireless communication, a P2P network, or the Internet and communicably connects the computer apparatus 50 to other devices.

The present embodiment is not limited to the embodiment described above and various configurations or embodiments can be applied within a scope not departing from the gist of the present embodiment.

With regard to the embodiment including each example described above, the following notes are further disclosed. The present invention is not limited to the following notes.

All examples and condition statements aided herein are intended for educational purposes to help the reader understand the concepts contributed by the inventor to further the invention and the art, and are to be construed as not limited to such specifically aided examples and conditions, and the construction of such examples is not relevant to depicting the superiority of the invention. While embodiments of the invention have been described in detail, it is to be understood that various changes, substitutions, and modifications may be made herein without departing from the spirit and scope of the invention.

Note 1

A node device comprising:
- a memory unit that memorizes a first verification key that is generated by using a first private key and verifies an electronic signature for priority approval;
- a verifying unit that verifies an electronic signature that is given to an unapproved transaction publicized on a distributed ledger by using the first verification key;
- a generating unit that generates, when a fact that an electronic signature given to the unapproved transaction is verified by the verifying unit as the electronic signature for priority approval, a block that preferentially includes the unapproved transaction over unapproved transactions to which the electronic signature for priority approval is not given; and
- a publicizing unit that publicizes the block on the distributed ledger.

Note 2

The node device according to Note 1, wherein the electronic signature for priority approval is an electronic signature generated by using the transaction and a private key of the priority seller.

Note 3

The node device according to Note 1 or 2, further comprising a creating unit that creates a transaction for reward acquisition for which a mining reward is adjusted according to number of unapproved transactions that are included in the block and to which the second electronic signature is given, wherein
the generating unit generates a block including the transaction for reward acquisition.

Note 4

The node device according to Note 1, wherein
the memory unit memorizes, instead of the first verification key, a second verification key that is generated by using the first verification key of an agent seller and a second private key of a priority seller and verifies an electronic signature for first verification key approval,
the verifying unit verifies a plurality of electronic signatures given to an unapproved transaction publicized on a distributed ledger by using the second verification key, and when a fact that the electronic signature for first verification key approval is included in the plurality of electronic signatures is verified, verifies a plurality of electronic signatures given to the unapproved transaction by using the first verification key that is further given to the unapproved transaction, and
the generating unit generates, when a fact that the electronic signature for priority approval is included in an electronic signature given to the unapproved transaction is verified by the verifying unit, a block that preferentially includes the unapproved transaction over unapproved transactions to which the electronic signature for priority approval is not given.

The invention claimed is:

1. An information processing apparatus that processes a priority granting process, the information processing apparatus comprising:
a memory unit that memorizes a verification key for verifying an electronic signature for priority approval generated by using a private key of a priority seller that grants a prioritized approval authority to a transaction; and a processor which executes a process including:
  verifying using the verification key, an electronic signature given to an unapproved transaction publicized on a distributed ledger;
  generating when an electronic signature given to the unapproved transaction is verified by the verifying as the electronic signature for priority approval, a block that preferentially includes the unapproved transaction over unapproved transactions to which the electronic signature for priority approval is not given; and
  publicizing the block on the distributed ledger.

2. The information processing apparatus according to claim 1, wherein the electronic signature for priority approval is an electronic signature generated by using the transaction and a private key of the priority seller.

3. The information processing apparatus according to claim 1, wherein the process executed by the processor further includes
  creating a transaction for reward acquisition for which a mining reward is adjusted according to number of unapproved transactions that are included in the block and to which the electronic signature for priority approval is given, wherein
  the generating generates a block including the transaction for reward acquisition.

4. An information processing apparatus that processes a priority granting process, the information processing apparatus comprising:
  a memory unit that memorizes a first verification key for verifying a first electronic signature generated by using a first private key of a priority seller that grants a prioritized approval authority to a transaction; and
  a processor which executes a process including:
    verifying a plurality of electronic signatures given to an unapproved transaction publicized on a distributed ledger by using the first verification key, and when a fact that the first electronic signature is included in the plurality of electronic signatures is verified, verifies the plurality of electronic signatures given to the unapproved transaction by using a second verification key for verifying a second electronic signature generated by using a second private key of an agent seller that is further given to the unapproved transaction;
  generating when a fact that the second electronic signature is included in an electronic signature given to the unapproved transaction is verified by the verifying, a block that preferentially includes the unapproved transaction over unapproved transactions to which the second electronic signature is not given; and
  publicizing the block on the distributed ledger.

5. An information processing apparatus that processes a priority granting process, the information processing apparatus comprising:
  a memory unit that memorizes a first verification key for verifying a first electronic signature generated by using a first private key of a priority seller and a second verification key of an agent seller verified by the first electronic signature; and
  a processor which executes a process including:
    verifying when the second verification key is memorized in the memory unit, an electronic signature that is given to the second verification key by using the first verification key and verifies, when an unapproved transaction is publicized on a distributed ledger, an electronic signature given to the unapproved transaction by using the second verification key;
    generating when a fact that an electronic signature given to the unapproved transaction is verified to be a second electronic signature generated by using a second private key of the agent seller by the verifying, a block that preferentially includes the unapproved transaction over unapproved transactions to which the second electronic signature is not given; and
    publicizing the block on the distributed ledger.

6. The information processing apparatus according to claim 4, wherein the first electronic signature is an electronic signature generated by using the first private key.

7. The information processing apparatus according to claim 4, wherein the second electronic signature is an electronic signature generated by using the second verification key and the first private key.

8. The information processing apparatus according to claim 4, wherein the process executed by the processor further includes
  creating a transaction for reward acquisition for which a mining reward is adjusted according to number of unapproved transactions that are included in the block and to which the second electronic signature is given, wherein
  the generating generates a block including the transaction for reward acquisition.

9. An information processing system comprising a first information processing apparatus and a second information processing apparatus, wherein
  the first information processing apparatus includes
  a first processor which executes a process including:
    acquiring a transaction created by a user, and
    generating an electronic signature to be given to a transaction created by the user by using a transaction acquired by the acquiring and created by the user and a private key of a server device, and
  the second information processing apparatus includes
  a memory unit that memorizes a verification key for verifying an electronic signature generated by using the private key, and
  a second processor which executes a process including:
    verifying an electronic signature given to an unapproved transaction publicized on a distributed ledger by using the verification key,
    generating when a fact that an electronic signature given to the unapproved transaction is an electronic signature generated by using the private key is confirmed by the verifying, a block that preferentially includes the unapproved transaction over unapproved transactions to which the electronic signature generated by using the private key is not given, and
    publicizing the block on the distributed ledger.

10. The information processing system according to claim 9, wherein the generating executed by the first processor includes
  generating when a fact that a price for generating an electronic signature is paid by the user is confirmed, an electronic signature to be given to a transaction created by the user by using the private key.

11. The information processing system according to claim 9, wherein the process executed by the first processor further includes
  giving an electronic signature generated by using the private key to a transaction created by the user, and
  publicizing the transaction on the distributed ledger.

12. The information processing system according to claim 9, further comprising a third information processing apparatus, wherein the first processor which executes a process includes
transmitting an electronic signature generated by using the private key that is generated by the generating by the first processor to the third information processing apparatus, and
the third information processing apparatus includes a third processor which executes a process including:
giving the electronic signature generated by using the private key to a transaction created by the user, and
publicizing a transaction to which the electronic signature generated by using the private key is given on the distributed ledger.

13. A non-transitory computer-readable recording medium storing therein a program for causing a processor to execute a priority granting process comprising:

memorizing, in a memory unit, a verification key for verifying an electronic signature for priority approval generated by using a private key of a priority seller that grants a prioritized approval authority to a transaction;

verifying an electronic signature given to an unapproved transaction publicized on a distributed ledger by using the verification key;

generating, when a fact that an electronic signature given to the unapproved transaction is verified by the verifying as the electronic signature for priority approval, a block that preferentially includes the unapproved transaction over unapproved transactions to which the electronic signature for priority approval is not given; and publicizing the block on the distributed ledger.

* * * * *